US012205195B2

(12) United States Patent
Fu et al.

(10) Patent No.: US 12,205,195 B2
(45) Date of Patent: Jan. 21, 2025

(54) MOBILE AR PROTOTYPING FOR PROXEMIC AND GESTURAL INTERACTIONS WITH REAL-WORLD IOT ENHANCED SPACES

(71) Applicant: City University of Hong Kong, Kowloon (HK)

(72) Inventors: Hongbo Fu, Sha Tin (HK); Hui Ye, Sha Tin (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 205 days.

(21) Appl. No.: 17/810,714

(22) Filed: Jul. 5, 2022

(65) Prior Publication Data
US 2024/0013450 A1   Jan. 11, 2024

(51) Int. Cl.
*G06T 11/00*    (2006.01)
*G06F 3/01*     (2006.01)

(52) U.S. Cl.
CPC ........... *G06T 11/00* (2013.01); *G06F 3/017* (2013.01)

(58) Field of Classification Search
None
See application file for complete search history.

(56) References Cited

U.S. PATENT DOCUMENTS 10,679,062 B1 * 6/2020 Donnelly ............... G06T 11/00
11,087,561 B2   8/2021 Fu et al.
2017/0061490 A1 * 3/2017 Ghahremani ...... G06Q 30/0277

OTHER PUBLICATIONS

Apple. 2019. Reality Composer. https://apps.apple.com/us/app/reality-composer/id1462358802.

Narges Ashtari, Andrea Bunt, Joanna McGrenere, Michael Nebeling, and Parmit K Chilana. 2020. Creating augmented and virtual reality applications: Current practices, challenges, and opportunities. In Proceedings of the 2020 CHI Conference on Human Factors in Computing Systems. 1-13.

Till Ballendat, Nicolai Marquardt, and Saul Greenberg. 2010. Proxemic interaction: designing for a proximity and prientation-aware environment. In ACM International Conference on Interactive Tabletops and Surfaces. 121-130.

(Continued)

*Primary Examiner* — Yi Wang
(74) *Attorney, Agent, or Firm* — Amin, Turocy & Watson, LLP

(57) ABSTRACT

One or more devices, systems, methods and/or non-transitory, machine-readable mediums are described herein for specifying one or more events in an augmented reality (AR) environment relative to a real-world (RW) environment. A system can comprise a memory that stores executable components, and a processor, coupled to the memory, that executes or facilitates execution of the executable components. The executable components can comprise a visual component that analyzes captured visual content of a RW environment, an interface component that integrates the visual content of the RW environment with AR content of an AR environment overlaying the RW environment, and a design component that facilitates in-situ placement of the AR content in the AR environment based on the visual content being overlayed, wherein the AR content comprises a specification of an event to be executed in the RW environment that triggers a virtual asset in the AR environment.

20 Claims, 10 Drawing Sheets

(56) References Cited

OTHER PUBLICATIONS

Andrea Bellucci, Aneesh P Tarun, Ahmed Sabbir Arif, and Ali Mazalek. 2016. Developing Responsive and Interactive Environments with the ROSS Toolkit. In Proceedings of the TEI'16: Tenth International Conference on Tangible, Embedded, and Embodied Interaction. 782-785.
Yuanzhi Cao, Tianyi Wang, Xun Qian, Pawan S Rao, Manav Wadhawan, Ke Huo, and Karthik Ramani. 2019. GhostAR: A time-space editor for embodied authoring of human-robot collaborative task with augmented reality. In Proceedings of the 32nd Annual ACM Symposium on User Interface Software and Technology. 521-534.
Zhe Cao, Gines Hidalgo, Tomas Simon, Shih-En Wei, and Yaser Sheikh. 2018. OpenPose: realtime multi-person 2D pose estimation using Part Affinity Fields. arXiv preprint arXiv:1812.08008 (2018).
Kathy Charmaz. 2008. Constructionism and the grounded theory method. Handbook of constructionist research 1, 1 (2008), 397-412.
Kathy Charmaz. 2014. Constructing grounded theory. sage.
Nils Dahlb ck, Arne J nsson, and Lars Ahrenberg. 1993. Wizard of Oz studies—why and how. Knowledge-based systems 6, 4 (1993), 258-266.
Mark Fiala. 2005. ARTag, a fiducial marker system using digital techniques. In 2005 IEEE Computer Society Conference on Computer Vision and Pattern Recognition (CVPR'05), vol. 2. IEEE, 590-596.
James Fogarty, Jodi Forlizzi, and Scott E Hudson. 2002. Specifying behavior and semantic meaning in an unmodified layered drawing package. In Proceedings of the 15th annual ACM symposium on User interface software and technology. 61-70.
Maxime Garcia, R mi Ronfard, and Marie-Paule Cani. 2019. Spatial Motion Doodles: Sketching Animation in VR Using Hand Gestures and Laban Motion Analysis. In Motion, Interaction and Games. 1-10.
Danilo Gasques, Janet G Johnson, Tommy Sharkey, and Nadir Weibel. 2019. What you sketch is what you get: Quick and easy augmented reality prototyping with pintar. In Extended Abstracts of the 2019 CHI Conference on Human Factors in Computing Systems. 1-6.
Saul Greenberg, Nicolai Marquardt, Till Ballendat, Rob Diaz-Marino, and MiaosenWang. 2011. Proxemic interactions: the new ubicomp? interactions 18, 1 (2011), 42-50.
Sinem Güven and Steven Feiner. 2003. Authoring 3D hypermedia for wearable augmented and virtual reality. In Proceedings of IEEE International Symposium on Wearable Computers (ISWC'03). 21-23.
Edward Twitchell Hall. 1966. The hidden dimension. vol. 609. Garden City, NY: Doubleday.
Bj rn Hartmann, Scott R Klemmer, Michael Bernstein, Leith Abdulla, Brandon Burr, Avi Robinson-Mosher, and Jennifer Gee. 2006. Reflective physical prototyping through integrated design, test, and analysis. In Proceedings of the 19th annual ACM symposium on User interface software and technology. 299-308.
Rex Hartson and Pardha Pyla. 2012. The UX Book: Process and guidelines for ensuring a quality user experience. Elsevier.
Ke Huo, Yuanzhi Cao, Sang Ho Yoon, Zhuangying Xu, Guiming Chen, and Karthik Ramani. 2018. Scenariot: spatially mapping smart things within augmented reality scenes. In Proceedings of the 2018 CHI Conference on Human Factors in Computing Systems. 1-13.
Adobe Inc. 2019. Adobe Aero. https://apps.apple.com/us/app/adobe-aero/id1401748913.
Sujin Jang, Niklas Elmqvist, and Karthik Ramani. 2014. GestureAnalyzer: visual analytics for pattern analysis of mid-air hand gestures. In Proceedings of the 2nd ACM symposium on Spatial user interaction. 30-39.
Runchang Kang, Anhong Guo, Gierad Laput, Yang Li, and Xiang'Anthony' Chen. 2019. Minuet: Multimodal interaction with an Internet of Things. In Symposium on Spatial User Interaction. 1-10.

Hirokazu Kato and Mark Billinghurst. 1999. Marker tracking and hmd calibration for a video-based augmented reality conferencing system. In Proceedings 2nd IEEE and ACM International Workshop on Augmented Reality (IWAR'99). IEEE, 85-94.
Annie Kelly, R Benjamin Shapiro, Jonathan de Halleux, and Thomas Ball. 2018. ARcadia: A rapid prototyping platform for real-time tangible interfaces. In Proceedings of the 2018 CHI Conference on Human Factors in Computing Systems. 1-8.
Daehwan Kim and Daijin Kim. 2006. An intelligent smart home control using body gestures. In 2006 International Conference on Hybrid Information Technology, vol. 2. IEEE, 439-446.
Han-Jong Kim, Chang Min Kim, and Tek-Jin Nam. 2018. Sketchstudio: Experience prototyping with 2.5-dimensional animated design scenarios. In Proceedings of the 2018 Designing Interactive Systems Conference. 831-843.
Han-Jong Kim, Ju-Whan Kim, and Tek-Jin Nam. 2016. miniStudio: Designers' Tool for Prototyping Ubicomp Space with Interactive Miniature. In Proceedings of the 2016 CHI Conference on Human Factors in Computing Systems. 213-224.
Scott R Klemmer, Jack Li, James Lin, and James A Landay. 2004. Papier-Mache: toolkit support for tangible input. In Proceedings of the SIGCHI conference on Human factors in computing systems. 399-406.
Barry Kollee, Sven Kratz, and Anthony Dunnigan. 2014. Exploring gestural interaction in smart spaces using head mounted devices with ego-centric sensing. In Proceedings of the 2nd ACM symposium on Spatial user interaction. 40-49.
Veronika Krau , Alexander Boden, Leif Oppermann, and Ren Reiners. 2021. Current practices, challenges, and design implications for collaborative AR/VR application development. In Proceedings of the 2021 CHI Conference on Human Factors in Computing Systems. 1-15.
Kin Chung Kwan and Hongbo Fu. 2019. Mobi3DSketch: 3D Sketching in Mobile AR. In Proceedings of the 2019 CHI Conference on Human Factors in Computing Systems. ACM.
David Ledo, Saul Greenberg, Nicolai Marquardt, and Sebastian Boring. 2015. Proxemic-aware controls: Designing remote controls for ubiquitous computing ecologies. In Proceedings of the 17th International Conference on Human-Computer Interaction with Mobile Devices and Services. 187-198.
David Ledo, Steven Houben, Jo Vermeulen, Nicolai Marquardt, Lora Oehlberg, and Saul Greenberg. 2018. Evaluation strategies for HCI toolkit research. In Proceedings of the 2018 CHI Conference on Human Factors in Computing Systems. 1-17.
David Ledo, Jo Vermeulen, Sheelagh Carpendale, Saul Greenberg, Lora Oehlberg, and Sebastian Boring. 2019. Astral: Prototyping Mobile and Smart Object Interactive Behaviours Using Familiar Applications. In Proceedings of the 2019 on Designing Interactive Systems Conference. 711-724.
Sang-Su Lee, Jeonghun Chae, Hyunjeong Kim, Youn-kyung Lim, and Kun-pyo Lee. 2013. Towards more natural digital content manipulation via user freehand gestural interaction in a living room. In Proceedings of the 2013 ACM international joint conference on Pervasive and ubiquitous computing. 617-626.
Wei-Po Lee, Che Kaoli, and Jhih-Yuan Huang. 2014. A smart TV system with body-gesture control, tag-based rating and context-aware recommendation. Knowledge-Based Systems 56 (2014), 167-178.
Germ n Leiva and Michel Beaudouin-Lafon. 2018. Montage: A video prototyping system to reduce re-shooting and increase re-usability. In Proceedings of the 31st Annual ACM Symposium on User Interface Software and Technology. 675-682.
Germ n Leiva, Jens Emil Gr nb k, Clemens Nylandsted Klokmose, Cuong Nguyen, Rubaiat Habib Kazi, and Paul Asente. 2021. Rapido: Prototyping Interactive AR Experiences through Programming by Demonstration. In The 34th Annual ACM Symposium on User Interface Software and Technology. 626-637.
Germ n Leiva, Cuong Nguyen, Rubaiat Habib Kazi, and Paul Asente. 2020. Pronto: Rapid Augmented Reality Video Prototyping Using Sketches and Enaction. In Proceedings of the 2020 CHI Conference on Human Factors in Computing Systems. 1-13.

(56) References Cited

OTHER PUBLICATIONS

Yang Li, Jason I Hong, and James A Landay. 2004. Topiary: a tool for prototyping location-enhanced applications. In Proceedings of the 17th annual ACM symposium on User interface software and technology. 217-226.
Hao Lu and Yang Li. 2012. Gesture coder: a tool for programming multi-touch gestures by demonstration. In Proceedings of the SIGCHI Conference on Human Factors in Computing Systems. 2875-2884.
Hao Lü and Yang Li. 2013. Gesture studio: authoring multi-touch interactions through demonstration and declaration. In Proceedings of the SIGCHI Conference on Human Factors in Computing Systems. 257-266.
Blair MacIntyre, Maribeth Gandy, Steven Dow, and Jay David Bolter. 2004. DART: a toolkit for rapid design exploration of augmented reality experiences. In Proceedings of the 17th annual ACM symposium on User interface software and technology. 197-206.
Nicolai Marquardt, Robert Diaz-Marino, Sebastian Boring, and Saul Greenberg. 2011. The proximity toolkit: prototyping proxemic interactions in ubiquitous computing ecologies. In Proceedings of the 24th annual ACM symposium on User interface software and technology. 315-326.
Nicolai Marquardt and Saul Greenberg. 2012. Informing the design of proxemic interactions. IEEE Pervasive Computing 11, 2 (2012), 14-23.
Nolwenn Maudet, Germ n Leiva, Michel Beaudouin-Lafon, andWendy Mackay. 2017. Design Breakdowns: Designer-Developer Gaps in Representing and Interpreting Interactive Systems. In Proceedings of the 2017 ACM Conference on Computer Supported Cooperative Work and Social Computing. 630-641.
Brad Myers, Sun Young Park, Yoko Nakano, Greg Mueller, and Andrew Ko. 2008. How designers design and program interactive behaviors. In 2008 EEE Symposium on Visual Languages and Human-Centric Computing. IEEE, 177-184.
Yasuto Nakanishi. 2012. Virtual prototyping using miniature model and visualization for interactive public displays. In Proceedings of the Designing Interactive Systems Conference. 458-467.
Tek-Jin Nam. 2005. Sketch-based rapid prototyping platform for hardware-software integrated interactive products. In CHI'05 extended abstracts on Human factors in computing systems. 1689-1692.
Michael Nebeling and Katy Madier. 2019. 360proto: Making Interactive Virtual Reality & Augmented Reality Prototypes from Paper. In Proceedings of the 2019 CHI Conference on Human Factors in Computing Systems. 1-13.
Michael Nebeling, Janet Nebeling, Ao Yu, and Rob Rumble. 2018. Protoar: Rapid physical-digital prototyping of mobile augmented reality applications. In Proceedings of the 2018 CHI Conference on Human Factors in Computing Systems. 1-12.
Dan R Olsen Jr. 2007. Evaluating user interface systems research. In Proceedings of the 20th annual ACM symposium on User interface software and technology. 251-258.
Hyungjun Park, Hee-Cheol Moon, and Jae Yeol Lee. 2009. Tangible augmented prototyping of digital handheld products. Computers in Industry 60, 2 (2009), 114-125.
Sarah Prange and Florian Alt. 2020. I Wish You Were Smart (er): Investigating Users' Desires and Needs Towards Home Appliances. In Extended Abstracts of the 2020 CHI Conference on Human Factors in Computing Systems. 1-8.
Joseph Redmon, Santosh Divvala, Ross Girshick, and Ali Farhadi. 2016. You only look once: Unified, real-time object detection. In Proceedings of the EEE conference on computer vision and pattern recognition. 779-788.
Gang Ren, Wenbin Li, and Eamonn O'Neill. 2016. Towards the design of effective freehand gestural interaction for interactive tv. Journal of Intelligent & Fuzzy Systems 31, 5 (2016), 2659-2674.
Nazmus Saquib, Rubaiat Habib Kazi, Li-Yi Wei, and Wilmot Li. 2019. Interactive body-driven graphics for augmented video performance. In Proceedings of the 2019 CHI Conference on Human Factors in Computing Systems. 1-12.
Hartmut Seichter, Julian Looser, and Mark Billinghurst. 2008. ComposAR: An intuitive tool for authoring AR applications. In 2008 7th IEEE/ACM International Symposium on Mixed and Augmented Reality. IEEE, 177-178.
Teddy Seyed, Alaa Azazi, Edwin Chan, Yuxi Wang, and Frank Maurer. 2015. Sod-toolkit: A toolkit for interactively prototyping and developing multi-sensor, multi-device environments. In Proceedings of the 2015 International Conference on Interactive Tabletops & Surfaces. 171-180.
Kihoon Son, Hwiwon Chun, Sojin Park, and Kyung Hoon Hyun. 2020. C-Space: An Interactive Prototyping Platform for Collaborative Spatial Design Exploration. In Proceedings of the 2020 CHI Conference on Human Factors in Computing Systems. 1-13.
Maximilian Speicher and Michael Nebeling. 2018. GestureWiz: A human-powered gesture design environment for user interface prototypes. In Proceedings of the 2018 CHI Conference on Human Factors in Computing Systems. 1-11.
Ryo Suzuki, Rubaiat Habib Kazi, Li-Yi Wei, Stephen DiVerdi, Wilmot Li, and Daniel Leithinger. 2020. RealitySketch: Embedding Responsive Graphics and Visualizations in AR through Dynamic Sketching. In Proceedings of the 33rd Annual ACM Symposium on User Interface Software and Technology. 166-181.
John Underkoffler and Hiroshi Ishii. 1999. Urp: a luminous-tangible workbench for urban planning and design. In Proceedings of the SIGCHI conference on Human Factors in Computing Systems. 386-393.
Tianyi Wang, Xun Qian, Fengming He, Xiyun Hu, Yuanzhi Cao, and Karthik Ramani. 2021. GesturAR: An Authoring System for Creating Freehand Interactive Augmented Reality Applications. In The 34th Annual ACM Symposium on User Interface Software and Technology. 552-567.
Tianyi Wang, Xun Qian, Fengming He, Xiyun Hu, Ke Huo, Yuanzhi Cao, and Karthik Ramani. 2020. CAPturAR: An Augmented Reality Tool for Authoring Human-Involved Context-Aware Applications. In Proceedings of the 33rd Annual ACM Symposium on User Interface Software and Technology. 328-341.
Zeyu Wang, Cuong Nguyen, Paul Asente, and Julie Dorsey. 2021. DistanciAR: Authoring Site-Specific Augmented Reality Experiences for Remote Environments. In Proceedings of the 2021 CHI Conference on Human Factors in Computing Systems. 1-12.
Xiabing Liu, Wei Liang, Yumeng Wang, Shuyang Li, and Mingtao Pei. 2016. 3D head pose estimation with convolutional neural network trained on synthetic images. In 2016 IEEE International Conference on Image Processing (ICIP). IEEE, 1289-1293.

* cited by examiner

MOBILE AR PROTOTYPING FOR PROXEMIC AND GESTURAL INTERACTIONS WITH REAL-WORLD IOT ENHANCED SPACES

BACKGROUND

Real-world Internet of Things (IoT) enhanced spaces can involve diverse proxemic and gestural (pro-ges) interactions between user entities and IoT devices/objects. Such interactions can mediate user entity interactions in an environment, such as a room-sized ubicomp ecology, thus facilitating natural-based interactions between user entities and nearby IoT devices and/or objects. Designing such interactions, such as including design device functions responsive to a user entity's proximity and/or gestures, is an emerging trend in IoT industries. Since these interactions can involve one or multiple user entities interacting with plural devices and/or objects in physical, real-world environments, prototyping tools for developing and mapping such interactions can be desired.

SUMMARY

The following presents a summary to provide a basic understanding of one or more embodiments described herein. This summary is not intended to identify key or critical elements, or to delineate any scope of the particular embodiments and/or any scope of the claims. The sole purpose of the summary is to present concepts in a simplified form as a prelude to the more detailed description that is presented later.

In one or more embodiments described herein, devices, systems, methods and/or apparatuses are described that can facilitate design and use of interactions in an augmented reality (AR) environment mapped to a real-world (RW) environment.

According to an embodiment, a system can comprise at least one memory that stores executable components, and at least one processor, coupled to the at least one memory, that executes or facilitates execution of the executable components. The executable components can comprise a visual component that analyzes captured visual content of a real-world environment, an interface component that integrates the visual content of the real-world environment with augmented reality (AR) content of an AR environment overlaying the real-world environment, and a design component that facilitates in-situ placement of the AR content in the AR environment based on the visual content being overlayed, wherein the AR content comprises a specification of an event to be executed in the real-world environment that is mapped to a dynamic effect of a virtual asset in the AR environment, wherein the event with the type of position/orientation/distance/gesture, is specified by an event proxy in the AR environment, and wherein the specified event further is triggered by a physical interaction to be executed by an entity.

According to another embodiment, a non-transitory machine-readable medium, can comprise executable instructions that, when executed by a processor facilitate performance of operations, comprising capturing visual content of a real-world environment, integrating the visual content with an augmented reality (AR) environment overlaying the real-world environment, detecting, an action satisfying an event specified by AR content, wherein the action comprises a single and/or compound position/orientation/distance/gesture(s) of an entity, and wherein the action is detectable in a first-person view or in a third-person view, and triggering a virtual asset in the AR environment based on execution in the real-world environment of the action, wherein the virtual asset is mapped to the specified event.

According to yet another embodiment, a method can comprise integrating, by a system operatively coupled to a processor, visual content or a real-world environment with an augmented reality (AR) environment overlaying the real-world environment, and detecting, by the system, in the real-world environment, satisfaction of an event specified by AR content in the AR environment, wherein the event is defined by a location, a distance, a gesture to be performed by an entity, and an orientation of the entity, and wherein the event is detectable in first-person and in third-person.

An advantage of the aforementioned system, non-transitory machine-readable medium, and/or method can be low cost and/or low skill barrier for generating interactions, e.g., RW/AR interaction mapping, while providing an immersive experience for real-word environments. Additionally, another advantage can be use of location, orientation, and/or distance as interaction factors coupled with gesture as an interaction factor to execute visual content relative to a specified event.

In one or more of the aforementioned system, non-transitory machine-readable medium, and/or method, the design component can further facilitate the in-situ placement of the AR content in the AR environment, wherein the AR content is placeable by a first-person view or by a third-person view in the AR environment.

An advantage thereof can be multiple-view authoring and testing of RW/AR interaction mapping.

In one or more of the aforementioned system, non-transitory machine-readable medium, and/or method, the interface component can further display, at a periphery of a display of the AR environment, part of the AR content that is not in a current view of the AR environment.

An advantage thereof can ease of awareness of interaction factors and/or visual content.

In one or more of the aforementioned system, non-transitory machine-readable medium, and/or method, the AR content can be placed at both of a pair of mobile devices.

An advantage thereof can be multi-device authoring and testing of RW/AR interaction mapping.

DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in this Detailed Description section.

Overview

Designing and implementing integrated interactions between an augmented reality (AR) environment and a real-world (RW) environment can often employ specialized hardware like consumer-level depth sensors or even commercial motion capture (MoCap) systems to track the motions of users, devices, and objects. Likewise, coding skills can often be desired for specifying triggering events, desired effects, and/or their relationships in programming-based interfaces. These one or more aspects can limit such prototyping techniques to indoor scenarios and can lessen and/or prevent designers with little or no programming skill to prototype in-situ in an ideation stage. Further, prototyping AR experiences or context-aware interactions is available only from the first-person view, instead of full-body pro-ges interactions, thus relying on recorded videos or actions for authoring and/or editing.

To account for one or more of these deficiencies, one or more embodiment described herein provide a framework for use of a mobile device, such as a mobile phone, tablet, and/or the like to efficiently track the camera pose, estimate full-body human poses, and/or infer the geometry of 3D scenes based on both first-person and third-person views to thereby design and/or specify AR scenes relative to a RW environment. Prototyping can be performed in-situ of full-body pro-ges interactions by using a single AR-enabled mobile device. The framework provides a novel mobile AR interface for prototyping pro-ges interactions in a real-world IoT enhanced environment, without the requirements of programming skills or extra hardware.

Figure 3:
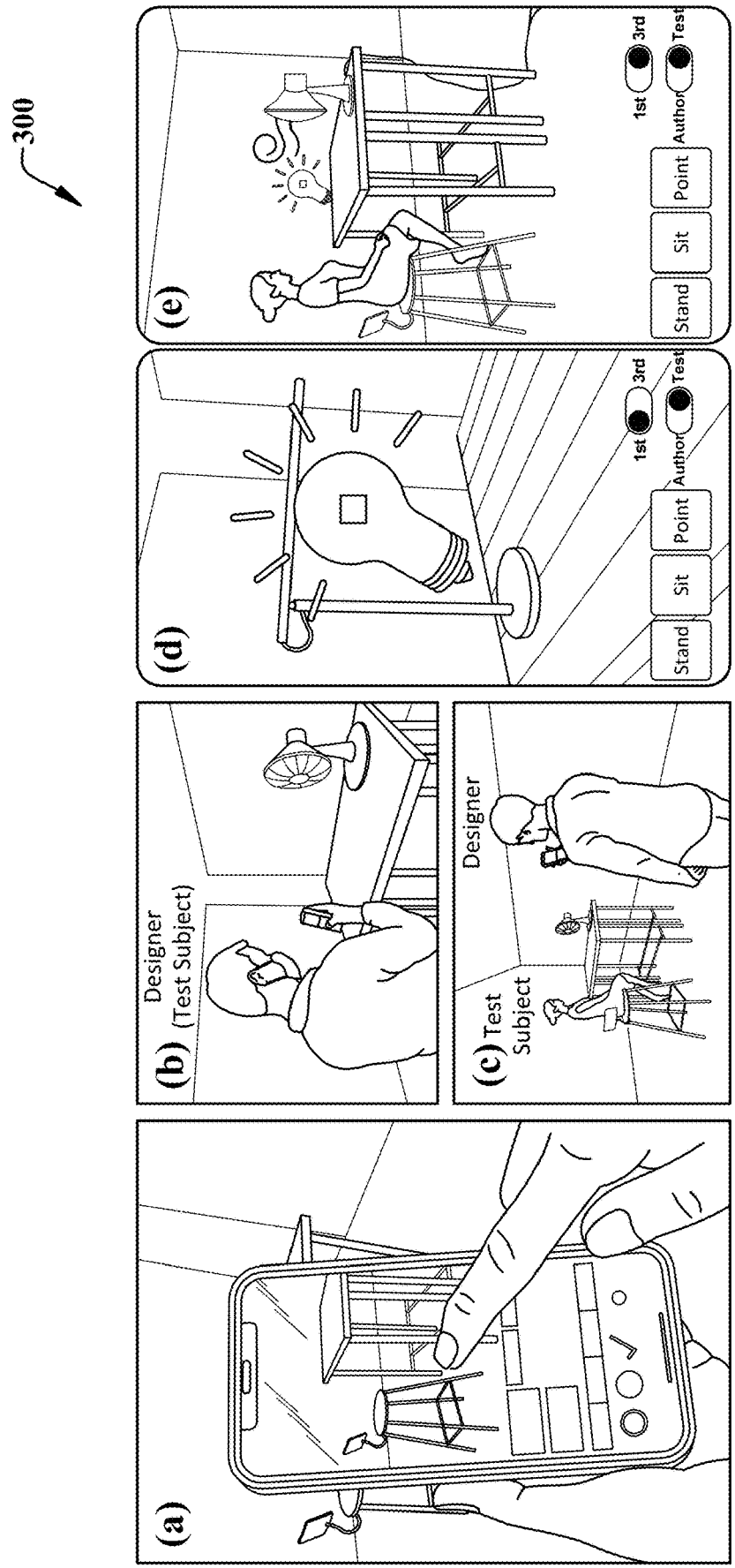
FIG. 3 illustrates as set of interaction factors that can be employed to specify an event by the RW/AR interaction system of FIG. 2, in accordance with one or more embodiments described herein.

Generally, in the authoring mode, the framework can allow designers to specify desired spatial events and virtual effects to be triggered by certain events quickly from a designer's view, without the presence of a test subject (i.e., a subject, such as a human entity, who will perform designer-specified events). The event types of the framework can be based on three key proxemic measurements: location, orientation, and distance. In one or more embodiments, full-body gestures, including sitting, standing, and/or pointing can be considered and/or employed to specify an event. For AR content authoring, an interface of the framework can support in-situ placement of both pre-defined and user-imported virtual assets. In the testing mode, the interface can support both first-person and third-person view testing of the prototyped interactions. Specifically, the designer might act as a test subject and perform the specified events in a first-person view (e.g., FIG. 3, box b) to trigger one or more designed virtual effects. Alternatively, the designer might invite another person as a test subject and observe his/her interactions from a third-person perspective (FIG. 3, box e).

The framework can target the prototype phase in an entire user-centered design cycle, including stages between conceptual design and intermediate design. During these stages, designers can have initial ideas in their minds and want to use low- or mediate-fidelity prototypes to explore and validate the overall interaction metaphor. The created prototypes can be considered as "private" to the project team for communication. Under the designing context of real-world IoT enhanced spaces, target users can be those who want to rapidly prototype pro-ges interactions for real-world environments, e.g., designing dynamic behaviors of smart objects responsive to user entities' proximity and/or gestures. User entities can be IoT designers, spatial interaction designers, urban planners, game designers, stage designers, event planners, and/or the like. Such user entities can desire to explore the physical relationships between potential users and their surrounding environments and expect for demonstrating, communicating, and/or iterating the interactive behaviors easily and rapidly. Accordingly, the one or more frameworks described herein can allow for user entities to quickly view and validate their ideas considering the physical spaces by themselves, demonstrate their conceptual designs to other entities for iterations, and save the intended effects as references for further implementation and development.

Further, designers can be skilled at designing the appearance of interfaces but can find it difficult to prototype interactive systems, since implementing such systems can employ programming skills to represent responsive or dynamic behaviors. The one or more frameworks defined herein can be coding-free to facilitate a lower and/or shorter learning curve. Indeed, virtual assets can be interactively placed in-situ in a respective mobile device's coordinate system, where the spatial relationships between real objects (e.g., associated with virtual assets) and the AR device can be determined by this interactive authoring process instead of additional hardware.

Example Embodiments

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Further, it will be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, one or more devices, systems and/or apparatuses thereof can further comprise one or more computer and/or computing-based elements described herein with reference to an operating environment, such as the operating environment 900 illustrated at FIG. 9. In one or more described embodiments, computer and/or computing-based elements can be used in connection with implementing one or more of the systems, devices, apparatuses and/or computer-implemented operations shown and/or described in connection with one or more figures described herein.

As used herein, the terms "entity", "requesting entity" and "user entity" can refer to a machine, device, component, hardware, software, smart device and/or human.

As used herein, "data" can comprise metadata.

As used herein, "use" can comprise access to.

As used herein, "cost" can refer to time, money, power, storage, memory, bandwidth, manual labor and/or the like.

While one or more devices and/or systems are described below with reference to us on a mobile device, such as a mobile phone, tablet, and/or portable computer, the one or more embodiments described herein are not limited to this use. Further, while one or more devices and/or systems are described below with reference to single mobile device, the one or more embodiments described herein also can be applicable to use by devices having auxiliary sensors, cameras and/or the like.

Turning now to the figures, one or more embodiments described herein can include one or more devices, systems, apparatuses and/or system-implemented methods that can enable a process to specify an event in an AR environment integrated relative to real-word physical content of a real-world environment. Generally, the one or more embodiments can provide an efficient, reliable and versatile framework for designing, testing, and/or implementing such event, via both first-person and third-person views.

Generally, a RW/AR Interaction system as described herein can employ raw data (e.g., data and/or metadata) from one or more sensors at an object, such as a mobile device and/or other device communicatively connectable to a mobile device. The raw data from the real-world environment can be converted to augmented reality (AR) environment content which can be employed by an innovative framework described herein to allow a user to specify an event in the AR environment overlaying the RW environment.

Figure 1:
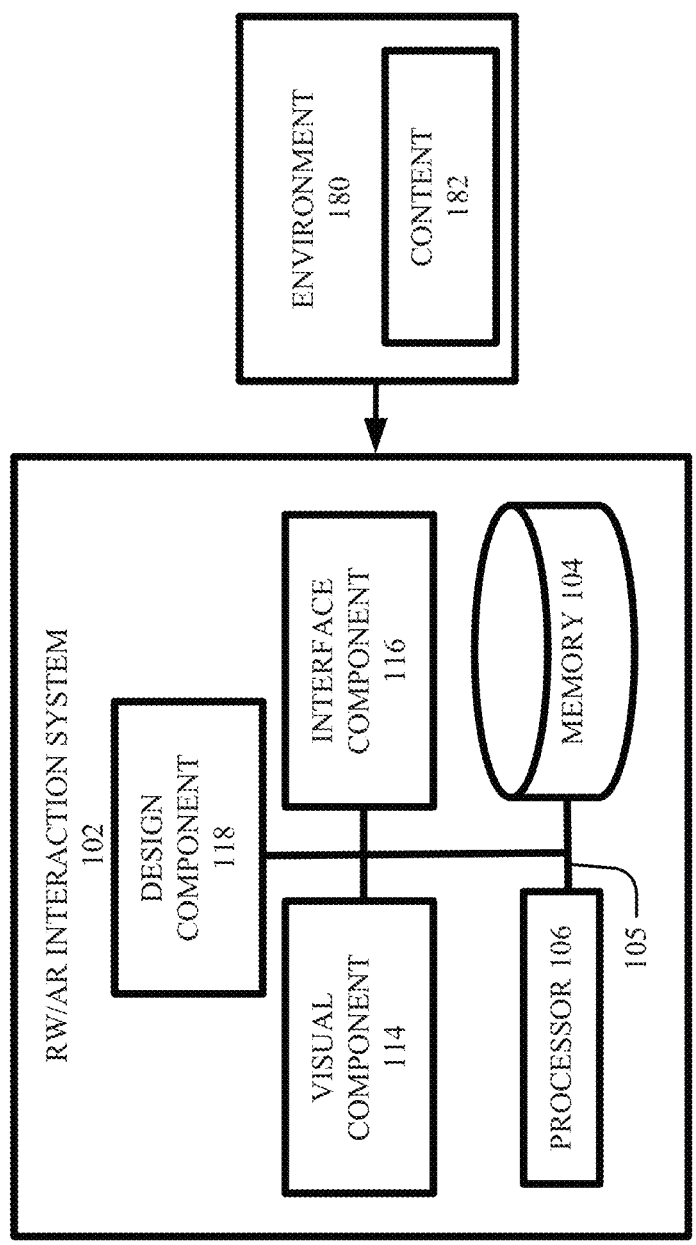
FIG. 1 illustrates an exemplary diagram of a real-world/augmented reality (RW/AR) interaction system, in accordance with one or more embodiments described herein.

Looking first to FIG. 1, a non-limiting system 100 is illustrated that can comprise one or more devices, systems, and/or apparatuses that can enable a process to specify an event in an AR environment overlaying a RW environment and facilitate interaction between the two environments, in accordance with one or more embodiments described herein. While referring here to one or more processes, facilitations, and/or uses of the non-limiting system 100, description provided herein, both above and below, also can be relevant to one or more other non-limiting systems described herein, such as the non-limiting system 200, to be described below in detail.

The non-limiting system 100 can enable both a process to analyze and use visual content from a real-world environment, and to specify interactions in an AR environment based on actual physical interactions in the RW environment overlayed by the AR environment. As illustrated, the non-limiting system 100 can comprise a RW/AR interaction system 102 comprising a processor 106, memory 104, bus 105, visual component 114, interface component 116 and design component 118. Generally, the visual component 114 can analyze captured visual content, such as content 182, of a real-world environment, such as RW environment 180. Generally, the interface component 116 can, using the visual content 182, integrate the visual content 182 of the RW environment 180 with augmented reality (AR) content of an AR environment overlaying the RW environment 180. The design component 118 can, functioning with the visual component 114 and interface component 116, facilitate in-situ placement of the AR content in the AR environment based on the visual content 182 being overlayed. The AR content can comprise a specification of an event to be executed in the RW environment 180 that triggers a virtual asset in the AR environment. The event can be specified by an event proxy describing single or compound location/orientation/distance/gesture(s) in the AR environment based on the visual content 182.

In one or more embodiments, a mobile device can comprise the RW/AR interaction system 102. In one or more other embodiments, the RW/AR interaction system 102 can be at least partially separate from the mobile device but can receive and/or obtain raw data and/or measurements from one or more sensors external to the RW/AR interaction system 102.

One or more aspects of a component (e.g., the visual component 114, interface component 116, and/or design component 118) can be employed separately and/or in combination, such as employing one or more of the memory 104 or the processor 106. Additionally, and/or alternatively, the processor 106 can execute one or more program instructions to cause the processor 106 to perform one or more operations by these components. The bus 105 can enable local communication between the elements of the RW/AR interaction system 102.

Figure 2:
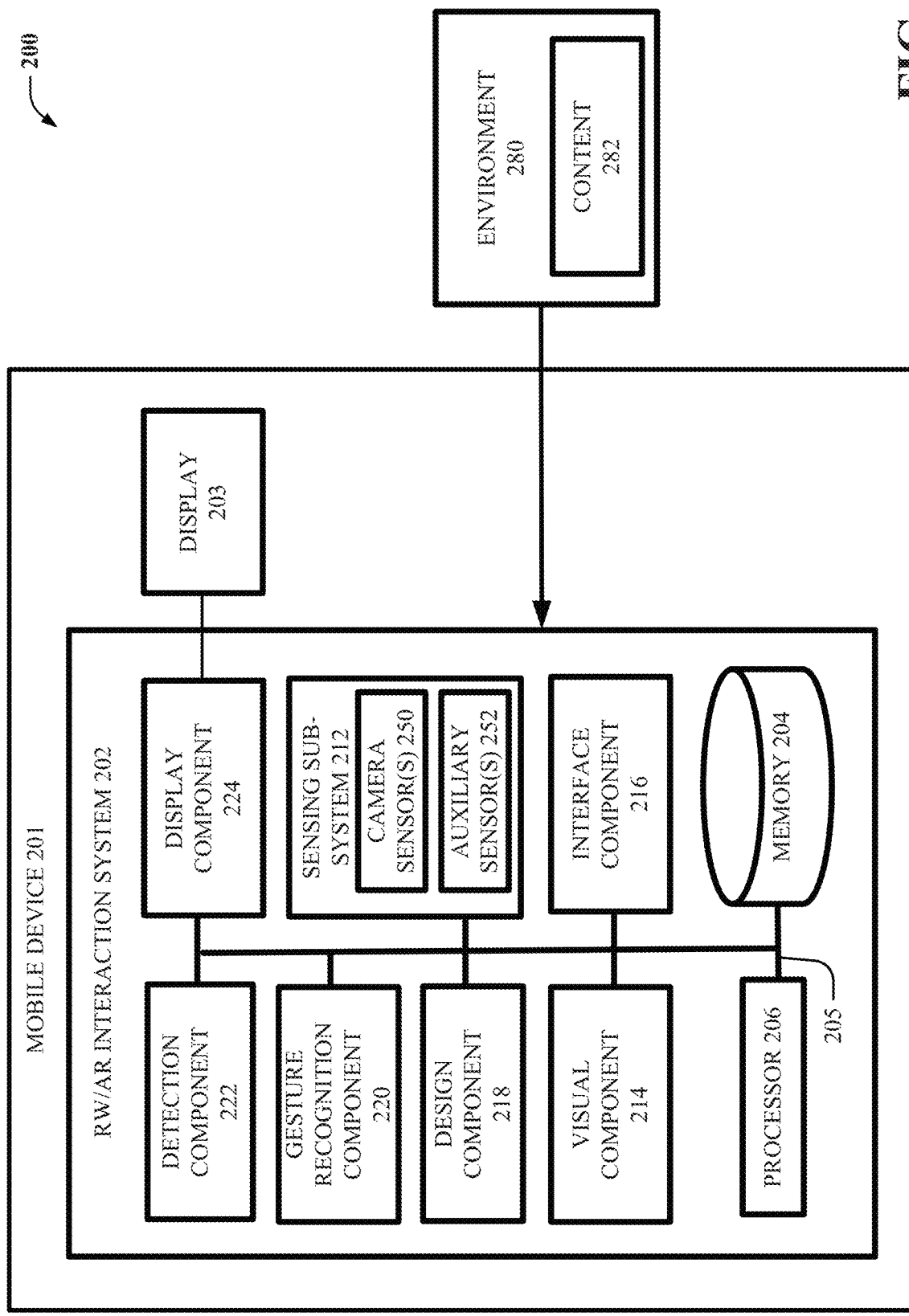
FIG. 2 illustrates another exemplary diagram of a real-world/augmented reality (RW/AR) interaction system, in accordance with one or more embodiments described herein.

Turning next to FIG. 2, a non-limiting system 200 is depicted. One or more embodiments of the non-limiting system 200 described herein can include one or more devices, systems and/or apparatuses that can enable a process to specify an event in an AR environment overlaying a RW environment and facilitate interaction between the two environments, in accordance with one or more embodiments described herein. Repetitive description of like elements and/or processes employed in respective embodiments is omitted for the sake of brevity. While referring here to one or more processes, facilitations, and/or uses of the non-limiting system 200, description provided herein, both above and below, also can be relevant to one or more non-limiting systems or elements of other non-limiting systems described herein, such as the non-limiting system 100.

The non-limiting system 200 can comprise a RW/AR interaction system 202 that can enable both a process to analyze and use visual content from a real-world environment, and to specify interactions in an AR environment based on actual physical interactions in the RW environment overlayed by the AR environment.

The RW/AR interaction system 202, as illustrated, can comprise any suitable type of component, machine, device, facility, apparatus, and/or instrument that comprises a processor and/or can be capable of effective and/or operative communication with a wired and/or wireless network. All such embodiments are envisioned. For example, the RW/AR Interaction system 202 can comprise a server device, computing device, general-purpose computer, special-purpose computer, tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players, and/or another type of device and/or computing device. Likewise, the RW/AR interaction system 202 can be disposed and/or run at any suitable device, such as, but not limited to a server device, computing device, general-purpose computer, special-purpose computer, tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players, and/or another type of device and/or computing device.

The RW/AR interaction system 202 can be associated with, such as accessible via, a cloud computing environment. For example, the RW/AR interaction system 202 can be associated with a cloud computing environment 1002 described below with reference to illustration 1000 of FIG. 10.

Operation of the non-limiting system 200 and/or of the RW/AR interaction system 202 is not limited to generation of a single event at an AR system. Rather, operation of the non-limiting system 200 and/or of the RW/AR interaction system 202 can be scalable. For example, the non-limiting system 200 and/or the RW/AR interaction system 202 can enable plural process executions of one or more of the above-listed types at least partially in parallel with one another.

In one or more embodiments, a mobile device 201 can comprise the RW/AR interaction system 202, such as illustrated at FIG. 2. In one or more other embodiments, the RW/AR interaction system 202 can be separate from the mobile device 201 but can obtain data from one or more sensors at the mobile device 201.

As illustrated the RW/AR interaction system 202 can comprise a sensing sub-system 212 comprising one or more camera sensor 250 and one or more auxiliary sensors 252, a visual component 214, interface component 216, design component 218, gesture recognition component 220, detection component 222, display component 224, processor 206, memory 204, and/or a bus 205.

One or more communications between one or more components of the non-limiting system 200 and/or the RW/AR interaction system 202 can be provided by wired and/or wireless means including, but not limited to, employing a cellular network, a wide area network (WAN) (e.g., the Internet), and/or a local area network (LAN). Suitable wired or wireless technologies for providing the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol, and/or other proprietary and/or non-proprietary communication protocols.

Discussion now turns to the processor 206, memory 204, and bus 205 of the RW/AR interaction system 202.

For example, in one or more embodiments, the RW/AR interaction system 202 can comprise a processor 206 (e.g., computer processing unit, microprocessor, classical processor, and/or like processor). In one or more embodiments, a component associated with the RW/AR interaction system 202, as described herein with or without reference to the one or more figures of the one or more embodiments, can comprise one or more computer and/or machine readable, writable, and/or executable components and/or instructions that can be executed by processor 206 to provide performance of one or more processes defined by such component(s) and/or instruction(s). In one or more embodiments, the processor 206 can comprise the sensing sub-system 212, visual component 214, interface component 216, design component 218, gesture recognition component 220, detection component 222, and/or display component 224.

In one or more embodiments, the RW/AR interaction system 202 can comprise a computer-readable memory 204 that can be operably connected to the processor 206. The memory 204 can store computer-executable instructions that, upon execution by the processor 206, can cause the processor 206 and/or one or more other components of the RW/AR interaction system 202 (e.g., the sensing sub-system 212, visual component 214, interface component 216, design component 218, gesture recognition component 220, detection component 222, and/or display component 224) to perform one or more actions. In one or more embodiments, the memory 204 can store computer-executable components (e.g., the visual component 214, interface component 216, design component 218, gesture recognition component 220, detection component 222, and/or display component 224).

The RW/AR interaction system 202 and/or a component thereof as described herein, can be communicatively, electrically, operatively, optically, and/or otherwise coupled to one another via a bus 205 to perform functions of non-limiting system 200, RW/AR interaction system 202 and/or one or more components thereof and/or coupled therewith. Bus 205 can comprise one or more of a memory bus, memory controller, peripheral bus, external bus, local bus, and/or another type of bus that can employ one or more bus architectures. One or more of these examples of bus 205 can be employed to implement one or more embodiments described herein.

In one or more embodiments, the RW/AR interaction system 202 can be coupled (e.g., communicatively, electrically, operatively, optically, and/or like function) to one or more external systems (e.g., a non-illustrated electrical output production system, one or more output targets, an output target controller, and/or the like), sources and/or devices (e.g., computing devices, communication devices, and/or like devices), such as via a network. In one or more embodiments, one or more of the components of the RW/AR interaction system 202 can reside in the cloud, and/or can reside locally in a local computing environment (e.g., at a specified location(s)).

It is noted that in one or more embodiments, a portion or more of the sensing sub-system 212 can be separate from, and thus external to, the RW/AR interaction system 202, such as similar to the display 203 of the mobile device 201.

In addition to the processor 206 and/or memory 204 described above, RW/AR interaction system 202 can comprise one or more computer and/or machine readable, writable, and/or executable components and/or instructions that, when executed by processor 206, can provide performance of one or more operations defined by such component(s) and/or instruction(s).

Turning now first to the sensing sub-system 212, one or more sensors can be comprised by the RW/AR interaction system 202. For example, the sensing sub-system 212 can comprise one or more camera sensors 250 and/or one or more auxiliary sensors 252. The one or more auxiliary sensors can comprise motion detection sensors, infrared sensors, and/or the like. Any suitable number of camera sensors 250 and any suitable number of auxiliary sensors 252 can be employed at the mobile device 201 to provide sensing of the virtual content 282 of the RW environment 280.

Turning next to the visual component 214, the visual component 214 can analyze captured visual content of a real-world environment 280, such as shown at block a of schematic 300 of FIG. 3. For example, the visual component 214 can obtain data, such as representing a horizontal plane, vertical plane and visual content 282 from one or more sensors 250, 252 of the sensing sub-system 212.

Using output from the visual component 214, the interface component 216 can integrate the visual content of the real-world environment 280 with augmented reality (AR) content of an AR environment overlaying the real-world environment. The AR environment can be generated by the interface component 216 and/or by a system, sub-system, and/or component that is separate from the RW/AR interaction system 202.

For example, the interface component 216 can, from data from the visual component 214, recognize a horizontal plane and a vertical plane of the real-world environment 280. The interface component 216 further can visualize, such as via a display 203 of the mobile device 201, an AR horizontal plane and AR vertical plane corresponding to the horizontal plane and vertical plane of the real-world environment for the user entity (e.g., designer). The interface component 216 also can recognize visual content 282 of the real-world environment 280 relative to the AR horizontal plane and the AR vertical plane, thus allowing the AR environment to accurately overlay the RW environment 280.

The detected planes can be used to place virtual assets in the AR space. For those planes that are difficult to be detected automatically, a plane creation function can be provided, such as by the interface component 216, with which user entities can specify two points on the ground plane to add a vertical plane passing through the two points. To indicate the positions of the located assets in an AR view, a small square indicator can be employed for each asset to represent its position, such as at the display 203.

It will be appreciated that the display component 224 can generated the visual display image to the display 203 based on outputs from the design component 218 and/or interface component 216. In one or more embodiments, the interface component 216 can display, such as via the display component 224 and/or display 203, at a periphery of a view of the AR environment, part of the AR content that is not in a current view of the AR environment. For example, if a virtual asset is in the camera view, its associated square can be green and at the center of the virtual asset, otherwise the associated square representation can turn red and float on the border of the camera view (e.g., AR display) corresponding to its invisible 3D position. This is illustrated at block a of schematic 600 of FIG. 6, for example, where a light 602 is depicted at the periphery.

Figure 4:
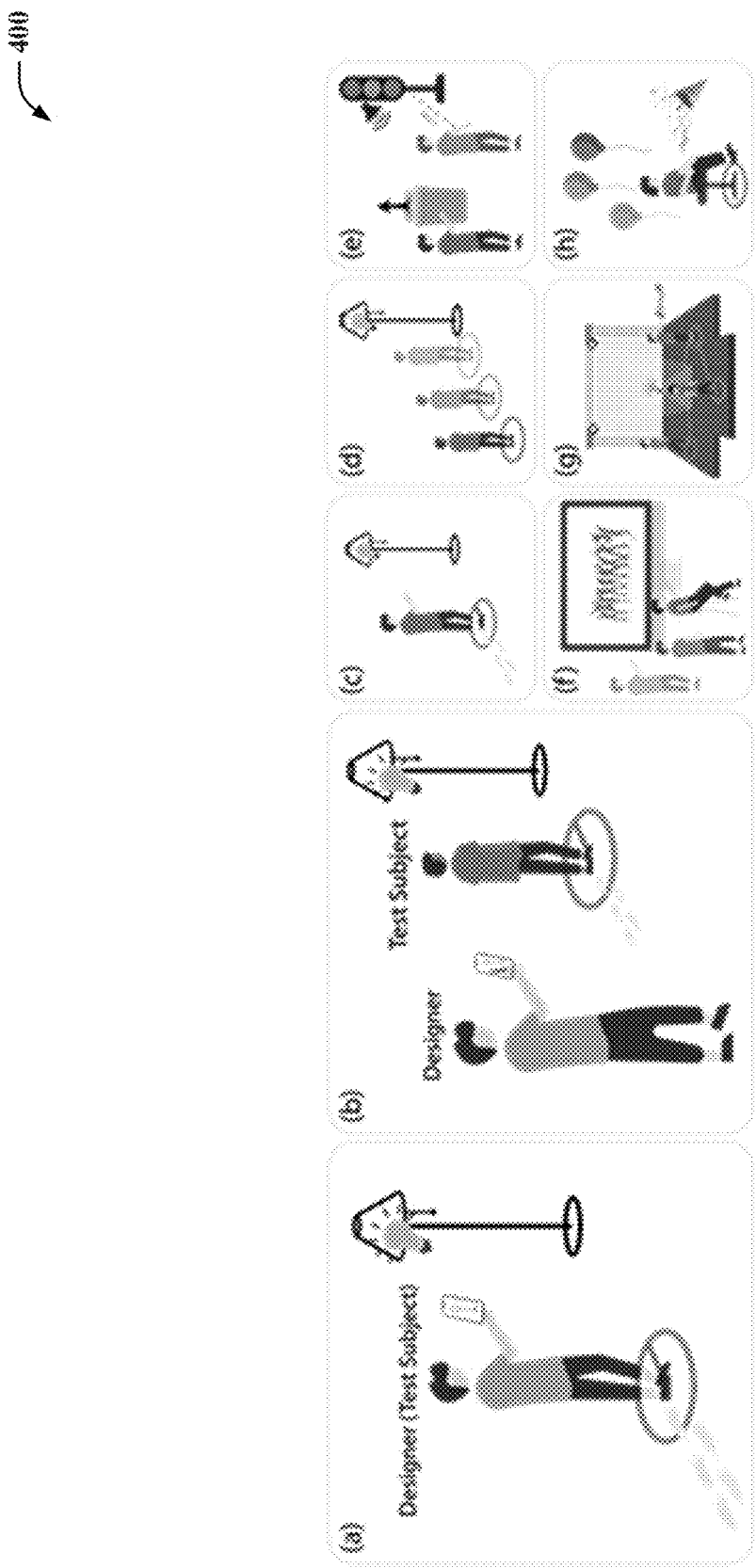
FIG. 4 illustrates a set of diagrams illustrating use of the RW/AR interaction system of FIG. 2 to test one or more events in AR relative to the real-world environment from the first-person view (a) and third-person view (b), and can be applied to multiple usage scenarios (c)-(h).

Turning now to FIGS. 3 and 4, the design component 218 can generally facilitate in-situ placement of the AR content in the AR environment based on the visual content of the RW environment 280 being overlayed. The AR content can comprise a specification of an event to be executed in the real-world environment 280 that triggers a virtual asset in the AR environment. The event can be specified by an event proxy representing the position/orientation/distance/gesture. Further, the design component 218 can map a virtual asset to the AR content, where the virtual asset can comprise a visual or audio response (e.g., virtual asset or audio/audible asset) to be triggered in the AR environment by execution of an action comprised by the event in the real-world environment 280.

As illustrated at schematic 300 of FIG. 3, when the user entity places the virtual assets, audio assets and effects in the AR space, the design component 218 records the position data and the pairs of assets and effects for further usage. See, g., blocks d and e of the schematic 300. After the user entity finishes defining the events, the system 202, such as the design component 218 and/or processor 206, can save specified position, orientation, distance, and gesture data, including also storing specified mappings between the events and effects in a dictionary for efficient event detection, future event specification, and/or current event testing and/or editing.

In one or more embodiments, the design component 218 can allow for in-situ content authoring in mobile AR from a first-person view. The triggering events and virtual assets with dynamic effects can be placed and anchored at specific locations in AR space using either first- (e.g., block b of schematic 300) or third-person view (e.g., block c of schematic 300). In this way, designers can go to specific locations in the RW environment 280 and view designed results.

A plurality of virtual assets (e.g., visual and/or audible assets) supportable by the design component 218 can comprise, but are not limited to, visual elements such as images, sketches, videos, 3D models, and/or animations and audio elements, such as music, sounds, and/or the like. Virtual assets can be prepared from 2D sketches, images and/or videos. A designer entity can extend an asset set by importing project-specific asset elements from a memory, album, and/or the like.

In addition, dynamic effects can be supported by the design component 218, such as appear, disappear, shake, play, pause, brighten, and/or darken. That is, a dynamic effect can be an effect of a virtual asset at the AR environment.

Looking briefly to FIG. 3, schematic 300, boxes d and e, an exemplary virtual asset can be an image of a lightbulb and/or a gust of air, representing virtual assets that can be interacted with to trigger a response in the RW environment 280, and/or can represent virtual assets that can themselves have been triggered by a response to an action/event happening in the RW environment 280 (e.g., where the lamp or fan is turned on).

Looking briefly to FIG. 4, schematic 400, boxes d to h represent and/or illustrate additional virtual assets, such as an audio icon, a lift arrow icon, a picture on a wall, stage lights, and/or party balloons. Each can be interacted with to trigger a response in the RW environment 280, and/or can represent virtual assets that can themselves have been triggered by a response to an action/event happening in the RW environment 280.

Figure 5:
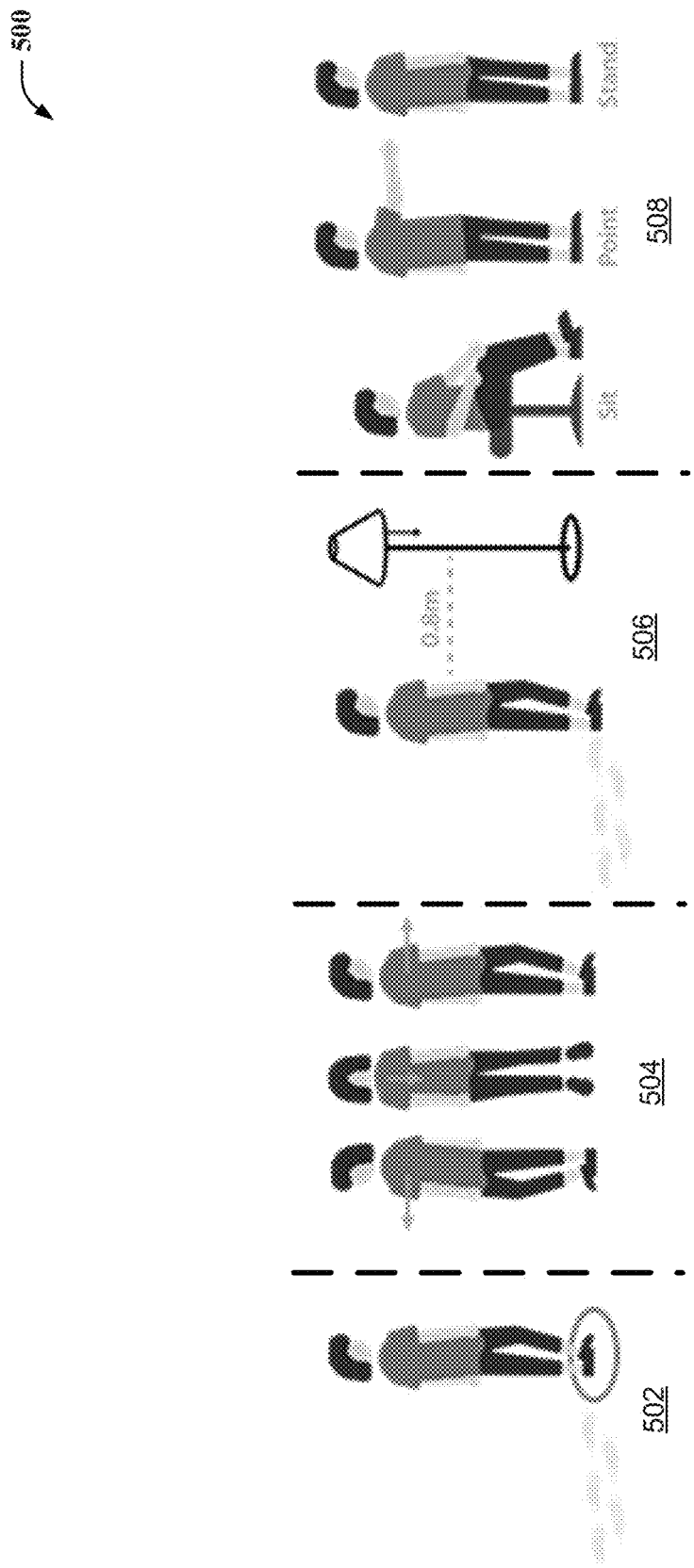
FIG. 5 illustrates a set of diagrams illustrating use of the RW/AR interaction system of FIG. 2 to support four types of spatially-related events.

Turning now to FIG. 5, four types of spatial-related factors can be supported by the AR/RW interaction system 202, and by the interface component 216 and design component 218. These can comprise one or more of: (a) Location (see, e.g., 502): occurs when a user entity comes into a certain spot, as indicated by the circle; (b) Orientation (see, e.g., 504): occurs when a user entity faces a certain direction; (c) Distance (see, e.g., 506): occurs when the distance between a user entity and a certain virtual asset and/or RW/AR content is below or above a certain threshold; and (d) Gesture (see, e.g., 508): occurs when a user entity performs a certain gesture. These special relation events can be at least partially based on proxemic measurements and/or other data provided by the visual component 214.

These spatial-related factors include both proxemic and gestural interactions. Among them the former refer to the global proximity of an entity and the latter refer to a form of local body movements. It is noted that the orientation and distance factors together can enable many similar features to a motion measurement.

The factors can be separated into two groups, including different combinations of the spatial-related factors: location-dependent events (location, location+orientation, and location+gesture) and location-independent events (distance, orientation, and gesture). Location-dependent events can be those occur at certain locations (e.g., sitting on a specific sofa in a room); location-independent events can be location-variant (e.g., sitting anywhere in a room). Multiple events within a same category can be added to one proxy for a compound event (e.g., location+orientation+gesture).

Further, for designing a scene, e.g., for placing one or more virtual assets or other AR content, and also for testing and editing the scene, the AR/RW interaction system 202, including the design component 218, interface component 216, and gesture recognition component 218, can support the third-person process. The process work for authoring both the location-dependent and location-independent events.

Figure 6:
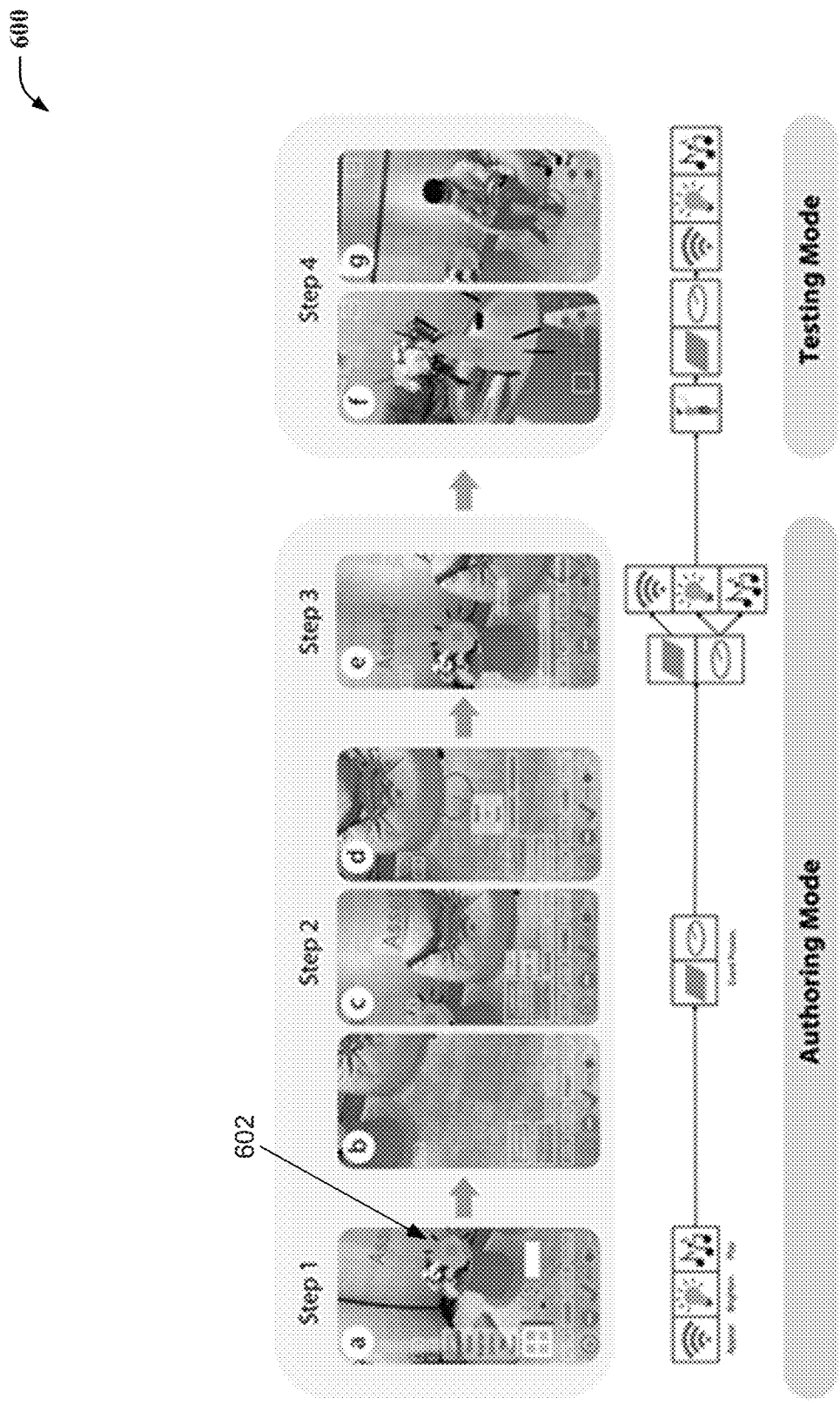
FIG. 6 illustrates a set of diagrams illustrating workflows with two modes of the RW/AR interaction system of FIG. 2, in accordance with one or more embodiments described herein.

For example, to support third-person view authoring and not an extra subject merely for demonstration, the system can provide a declarative way to specify desired events based on pro-ges interactions via setting triggering proxies from the third-person view, which are shown as circle and square proxies, respectively (FIG. 6).

Also, in one or more embodiments, the AR content can be placed at both of a pair of mobile devices. That is, two or more AR/RW interaction system 202 can cooperate to allow for cooperative AR content placement, testing and/or editing at a same time, or at different times, of a same scene. This includes from different combinations of first-person and/or third-person views.

Turning now to the detection component 222, generally, the detection component 222 can detect, in the real-world environment, execution of an action corresponding to an event being specified, wherein the action comprises a gesture, orientation, location and/or distance, and wherein the detection triggers the virtual asset in the AR environment. And as noted, detection can be supported both at first-person and/or third-person viewpoints.

To detect events from the first-person view, motion tracking, such as from a corresponding AR kit can be employed, to obtain the current 3D pose of the mobile phone. For location factor, horizontal distances between the obtained 3D device position and the positions specified can be continuously calculated. For location factor, the AR display can be projected to the ground plane and distance to the location-dependent proxies can be calculated. For orientation factor, the horizontal angular differences between the 3D device orientation and the orientations of specified orientation factors can be calculated. For distance factors, the horizontal distances between the 3D device position and the assets positions of specified distance events can be calculated. Accordingly, different factors can be detected correspondingly.

To detect events from the third-person view, human pose estimation and motion tracking from a corresponding AR kit can be employed to obtain the 2D position and skeleton-based pose data. The 2D human/entity position can be back-projected from the camera view into the automatically detected ground plane to get the 3D position of the human/entity. The horizontal distances between a test subject/entity and the assets in the ground plane can be calculated. The calculated distances can be used to detect the authored location and distance factors.

In one or more embodiments, a support vector machine (SVM) model can be trained to detect and classify the gestures and facing orientations of a test subject for the gesture and orientation events. In one or more embodiments, a gesture recognition component 218, which can employ the SVM model, can identify a gesture performed in the RW environment 280, where the gesture can be recognized absent view of a full body of an entity executing the gesture.

Turning now to FIG. 6, and also still referencing FIG. 2, four main steps are described for prototyping with an embodiment of the AR/RW interaction system 202: (1) assets and effects authoring, (2) triggering events creation, (3) effects and events mapping, and (4) result testing and viewing. The AR/RW interaction system 202 can allow designer entities to go back to any step for changes to achieve iterative prototyping. It is noted that the steps are defined relative to use of a mobile device 201, such as a mobile phone, for employing, displaying, and using the AR/RW interaction system 202.

Step 1: assets and effects authoring. Once the user entity selects a desired asset (e.g., virtual asset) from the menu, the asset can be first added to the scene in front of the camera. Then when the user entity drags the asset on the screen, the design component 218 can system automatically snap the asset to the closest plane. The user entity can use a pan or pinch gesture to rotate or scale the asset, respectively, such as at the display 203 of the mobile device 201 being used. Next the user entity can select a desired effect to the added asset. Each time the user entity selects an effect, it will be previewed on the selected asset. The created effects can be viewed or deleted when pressing the "Edit" or "Delete" button.

Use case: User A wants to prototype a living-room scenario: when a subject approaches a sofa, a WiFi signal becomes available indicated by an appearing WiFi sign, and once the subject sits down and faces forward, the light will turn on indicated by a brightening bulb and the speaker will play the music. User A is first in the "Authoring" mode (Step 1, block a of schematic 600) and clicks the "Asset" button to open the asset set. User A then swipes and selects a WiFi, a bulb, and a music asset from the asset set, and places them at desired locations. To assign effects to the created assets, User A selects each asset of interest and a desired effect from the effect menu (e.g., "Appear" for the WiFi asset, "Brighten" for the bulb asset, and "Play" for the music asset).

Step 2: triggering events creation. To add a location-dependent event, the user entity taps a specific location on the detected ground plane. A circle proxy (see, e.g., FIG. 6, step 2, block d) can appear to visualize the newly added event. The user entity can leave the circle proxy to define a location event only. To add other types of events to the same location, with the proxy selected in green, the user entity can select from the "Gesture" menu to define a location+gesture event, or can press the "Orientation" button and then adjust the red line around the location proxy to specify a location+orientation event.

Location-independent events can be added similarly such as using a square proxy (see, e.g., FIG. 6, step 2, block b) representing a virtual location added to the ground plane in the AR scene.

To define a distance event, the user entity first taps to select a target asset, then specifies an inequality symbol, and finally inputs a specific number with the unit of the meter (see, e.g., FIG. 6, step 2, block c) Adding a gesture or orientation event works similarly to the location-dependent events creation process. The user entity can view or delete the added event through the "Edit" button or "Delete" button, respectively.

Use case: After pressing on the "Location Independent" menu and "Distance" button, User A selects the WiFi asset and inputs "0.8" in the text box (e.g., blocks b and c). Then an event describing the distance to the WiFi asset below 0.8 meters is created and visualized as a green square on the ground plane. User A then presses on the "Location Dependent" menu, and clicks on the ground plane to specify a spot. A circle representing this location (block d) is then added in the scene. User A can drag and move the circle to change the location. Next, User A clicks the "Gesture" button and selects "Sit" to add a sit event. Afterwards User A clicks the "Orientation" button, and drags to rotate the red line indicating the facing orientation. Finally, User A presses the green check button to confirm such a compounded event.

Step 3: effects and events mapping. Provided is a direct mapping interface (block e) for defining the relationships between the created assets, effects, and events. From the AR scene, the user entity first taps to select a circle or square proxy, which may have multiple events associated with a physical or virtual location. The events related to this proxy will be listed for selection. After selecting an event, the user entity taps to select an asset still from the AR scene. The effects related to this selected asset will be displayed for selection. Once the two-step selection is completed, the user entity presses the green check button to save such a mapping. All the mappings can be viewed or removed through the "Edit" or "Delete" button, respectively.

Use case: User A first selects the square proxy and the displayed event "<0.8 m to Asset 1", then selects the WiFi asset and the displayed effect "Appear", and finally clicks the green check button to confirm the mapping. Similarly, User A creates the mappings from the location+orientation+ sit event to both the "Play" effect of the music asset and the "Brighten" effect of the bulb asset (block e).

Step 4: result testing and viewing. The user entity can switch to the "Testing" mode (blocks f and g) to test and view the prototyped result. In this mode, all the added assets will be hidden at the beginning and wait for being triggered. In the first-person view testing (block f), the user entity can hold and move the phone to trigger specified location, orientation, or distance events. For gesture events, the system 202, e.g., the design component 218, can provide the user entity with three buttons (block f) to manually activate them, since full-body gestures can be difficult to recognize from the first-person viewpoint. For the third-person view testing (block g), when a test subject entity enters the camera view, the system, e.g., detection component 220, can automatically detect specified pro-ges interactions of the subject entity and can display or play the corresponding dynamic effects being triggered. The user entity can view and test the prototyped results from different locations and views for multiple times.

Use case: User A switches to the "Testing" mode, which is set to the first-person testing by default (FIG. 4(*f*)). Jessie holds the phone and walks approaching the WiFi asset. When the distance between the phone and the WiFi asset is below 0.8 meters, the WiFi asset will appear. Then when User A sits down on the sofa with the phone facing forward and presses the "Sit" button, the music is played, and the bulb is brightened. To test in a third-person view (block f), User A asks another subject User B to enter the AR view and perform interactions, similar to what User A performed for the first-person view testing.

Example Method of Use

Figure 7:
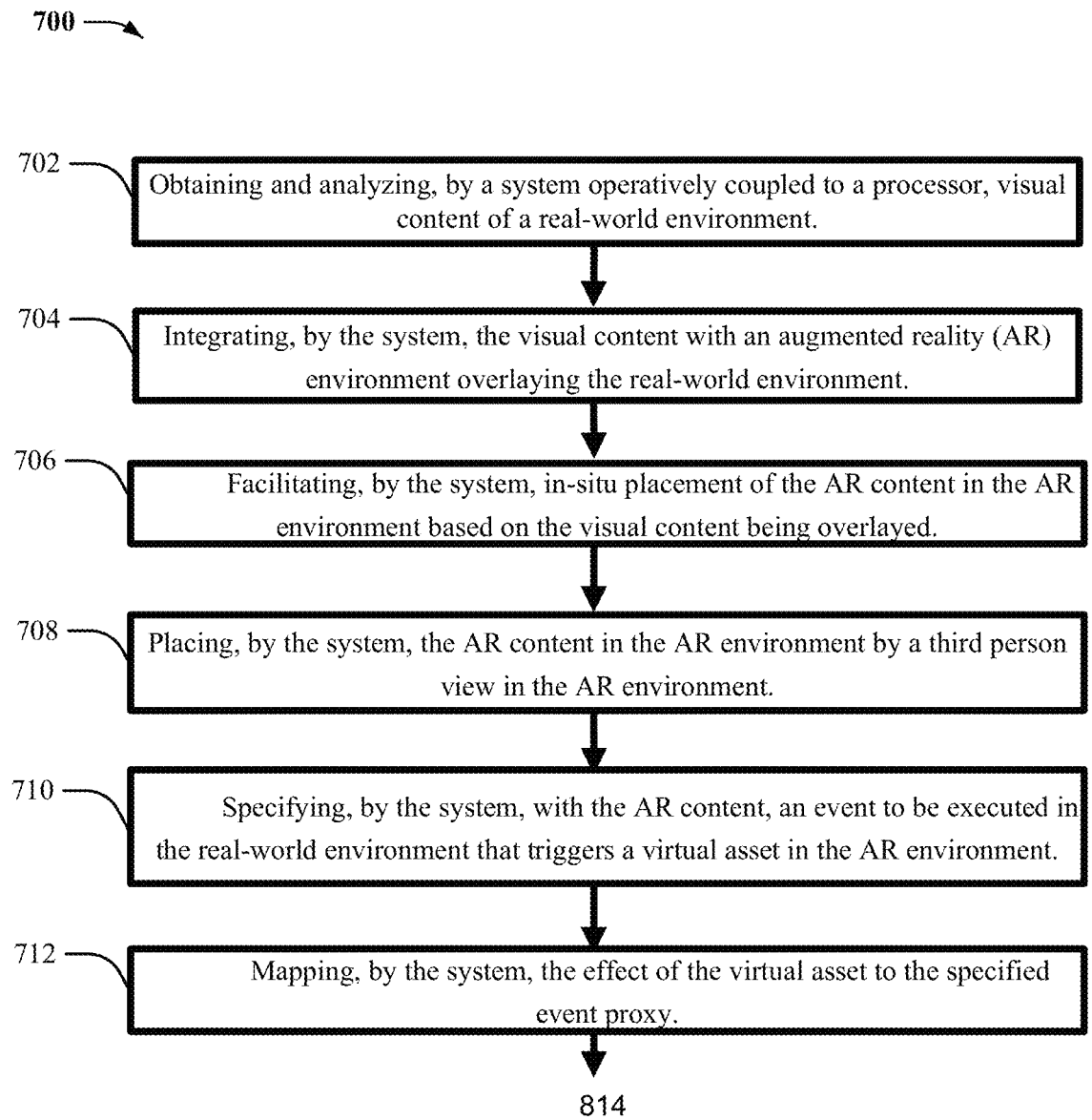
FIG. 7 illustrates a process flow of a method of use of the RW/AR interaction system of FIG. 2, in accordance with one or more embodiments described herein.
Figure 8:
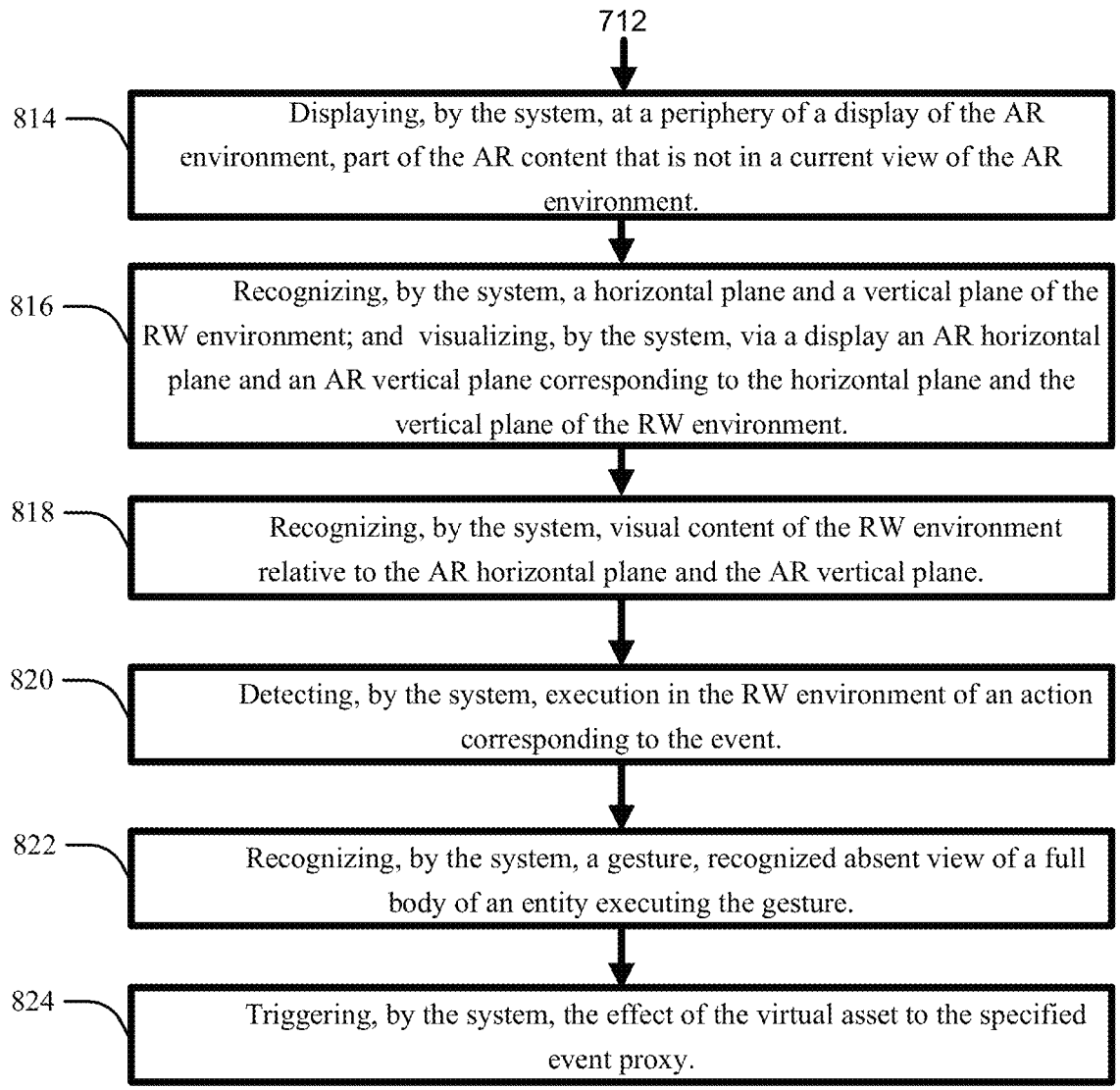
FIG. 8 illustrates another process flow of a method to specify an event in an AR environment relative to a real-world environment, such as using the RW/AR interaction system of FIG. 2, in accordance with one or more embodiments described herein.

Turning now to FIGS. 7 and 8, illustrated is a flow diagram of an example, non-limiting method 800 that can facilitate a process to specify an event at an AR environment relative to and integrated with a real-world environment. It will be appreciated that while the non-limiting method 700 is described relative to the RW/AR integration system 202, the non-limiting method 700 can be applicable to the RW/AR integration system 102, and/or other embodiments described herein but not particularly illustrated. Repetitive description of like elements and/or processes employed in respective embodiments is omitted for sake of brevity.

Looking first to operation 702 at FIG. 8, the non-limiting method 700 can comprise obtaining and analyzing, by a system operatively coupled to a processor (e.g., visual component 214), visual content (e.g., content 282) of a real-world (RW) environment (e.g., environment 280).

At operation 704, the non-limiting method 700 can comprise integrating, by the system (e.g., interface component 216), the visual content with an augmented reality (AR) environment overlaying the RW environment.

At operation 706, the non-limiting method 700 can comprise facilitating, by the system (e.g., design component 218), in-situ placement of the AR content in the AR environment based on the visual content of the RW environment being overlayed.

At operation 708, the non-limiting method 700 can comprise placing, by the system (e.g., design component 218), the AR content in the AR environment by a third-person view in the AR environment.

At operation 710, the non-limiting method 700 can comprise specifying, by the system (e.g., design component 218), with the AR content, an event to be executed in the real-world environment that triggers a virtual asset in the AR environment.

At operation 712, the non-limiting method 700 can comprise mapping, by the system (e.g., design component 218 and interface component 216), the dynamic effect of the virtual asset to the specified event proxy.

At operation 814 (FIG. 8), the non-limiting method 800 can comprise displaying, by the system (e.g., display component 224), at a periphery of a display of the AR environment, part of the AR content that is not in a current view of the AR environment.

At operation 816, the non-limiting method 700 can comprise recognizing, by the system (e.g., interface component 216), a horizontal plane and a vertical plane of the RW environment, and visualizing, by the system (e.g., interface component 216), via a display (e.g., via display component 224), an AR horizontal plane and an AR vertical plane corresponding to the horizontal plane and the vertical plane of the RW environment.

At operation 818, the non-limiting method 700 can comprise recognizing, by the system (e.g., detection component 222 and interface component 216) visual content of the RW environment relative to the AR horizontal plane and the AR vertical plane.

At operation 820, the non-limiting method 700 can comprise detecting, by the system (e.g., detection component 222), execution in the RW environment of an action corresponding to the event.

At operation 822, the non-limiting method 700 can comprise recognizing, by the system (e.g., gesture recognition component 220), a gesture, recognized absent view of a full body of an entity executing the gesture.

At operation 824, the non-limiting method 700 can comprise triggering, by the system (e.g., detection component 222), the effect of the virtual asset to the specified event proxy.

Summary

In summary, one or more devices, systems, methods and/or non-transitory, machine-readable mediums are described herein for specifying one or more events in an augmented reality (AR) environment relative to a real-world (RW) environment. A system can comprise at least one memory that stores executable components, and at least one processor, coupled to the at least one memory, that executes or facilitates execution of the executable components. The executable components can comprise a visual component that analyzes captured visual content of a RW environment, an interface component that integrates the captured visual content of the RW environment with AR content of an AR environment overlaying the RW environment, and a design component that facilitates in-situ placement of the AR content in the AR environment based on the visual content being overlayed, wherein the AR content comprises a specification of an event to be executed in the RW environment that triggers a virtual asset in the AR environment, wherein the event is specified by an event proxy representing a single or compound location/orientation/distance/gesture in the AR environment based on the visual content An advantage of the aforementioned system, non-transitory machine-readable medium, and/or method can be low cost and/or low skill barrier for generating interactions, e.g., RW/AR interaction mapping, while providing an immersive experience for real-word environments. Additionally, another advantage can be use of location, orientation and/or distance as interaction factors coupled with gesture as an interaction factor to execute visual content relative to a specified event.

In one or more of the aforementioned system, non-transitory machine-readable medium, and/or method, the design component can further facilitate the in-situ placement of the AR content in the AR environment, wherein the AR content is placeable by a first-person view or by a third-person view in the AR environment. An advantage thereof can be multiple-view authoring and testing of RW/AR interaction mapping.

In one or more of the aforementioned system, non-transitory machine-readable medium, and/or method, the interface component can further display, at a periphery of a display of the AR environment, part of the AR content that is not in a current view of the AR environment. An advantage thereof can ease of awareness of interaction factors and/or visual content.

In one or more of the aforementioned system, non-transitory machine-readable medium, and/or method, the AR content can be placed at both of a pair of mobile devices. An advantage thereof can be multi-device authoring and testing of RW/AR interaction mapping.

The aforementioned system, non-transitory machine-readable medium, and/or method can further have one or more additional, and/or alternative, benefits, advantages, uses, desirable features and/or the like. For example, one or more embodiments described herein can allow for low cost and/or low skill barrier for creating interactive events. As compared to conventional systems, the one or more embodiments describe herein can save a user entity time, labor, and/or money for building interactive events relative to an AR/RW integrated environment system. Such integrations can enhance interdisciplinary communication in early-stage design. The system also can allow for self-evaluation and self-validation of function of the interactive vent. That is, the one or more embodiments described herein can be employed without complex physical components, materials, and/or sensors to test ideas in an interactive manner. Indeed, one or more embodiments described herein provide a coding-free tool, reducing learning cost and facilitating a low barrier of entry.

One or more embodiments described herein can reduce design viscosity by providing a flexible solution for multiple-view authoring and testing of specified events, and of the interaction factors thereof. That is multi-view perspectives can be integrated in a single interface, which can reduce choices and repetitions of existing mixes of tools. For example, both first-person and third-person considerations can be addressed during specification, rather than at later stages, making specification more efficient, productive, and/or faster.

The authoring (specifying) and testing also is in-situ, allow for an immersive experience for real-world scenes. That is, real interactions can be specified in an AR environment, but based on, and even allowing interaction with, real-word content of a real-world environment. The one or more embodiments defined herein can provide integration between the AR and RW environments, while still supporting faithful interaction scale, area, position, and size of real-world content integrated into the AR environment. This is as compared to existing tools that can lead to difference and/or undesired scaling between real-world content and that content integrated into an AR environment. As a result, the one or more embodiments herein can convey precise interactions between user entities and objects in the AR environment, and further can precisely integrate real-world interactions between user entities and object into AR.

This authoring (specifying) and testing is further facilitated by the ease of controllability of the one or more embodiments described here. For example, offering dynamic processes for introduction and/or combination of interaction factors to actual, real-world content in an AR 3D and interactive view outweighs use of conventional 2D and/or static storyboards.

Indeed, a practical application of the systems, computer-implemented methods, and/or computer program products described herein can be a coding-free tool, reducing learning cost and facilitating a low barrier of entry. Overall, such computerized tools can constitute a concrete and tangible technical improvement in the fields of augmented reality event specification, without being limited thereto.

One or more embodiments described herein can be inherently and/or inextricably tied to computer technology and cannot be implemented outside of a computing environment. For example, one or more processes performed by one or more embodiments described herein can more efficiently, and even more feasibly, provide program and/or program instruction execution, such as relative to augmented reality event specification, as compared to existing systems and/or techniques lacking such approach(es). Systems, computer-implemented methods, and/or computer program products enabling performance of these processes are of great utility in the fields of augmented reality event specification and/or AR/RW event integration/interaction and cannot be equally practicably implemented in a sensible way outside of a computing environment. Indeed, AR itself is and/or involves a type of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately, and/or effectively electronically manage/design augmented reality event specification and/or AR/RW event integration/interaction, as the one or more embodiments described herein can provide this process. Further, a human, or even thousands of humans, cannot efficiently, accurately, and/or effectively integrate a real-world environment with an augmented reality environment, or even interact with an augmented reality environment at all, as the one or more embodiments described herein can provide these processes. And, neither can the human mind nor a human with pen and paper electronically effectively electronically achieve, provide and/or execute such processes, as conducted by one or more embodiments described herein.

In one or more embodiments, one or more of the processes and/or frameworks described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, cloud computing systems, computer architecture, and/or another technology.

One or more embodiments described herein can be fully operational towards performing one or more other functions (e.g., fully powered on, fully executed and/or another function) while also performing one or more of the one or more operations described herein.

Example Operating Environment

Figure 9:
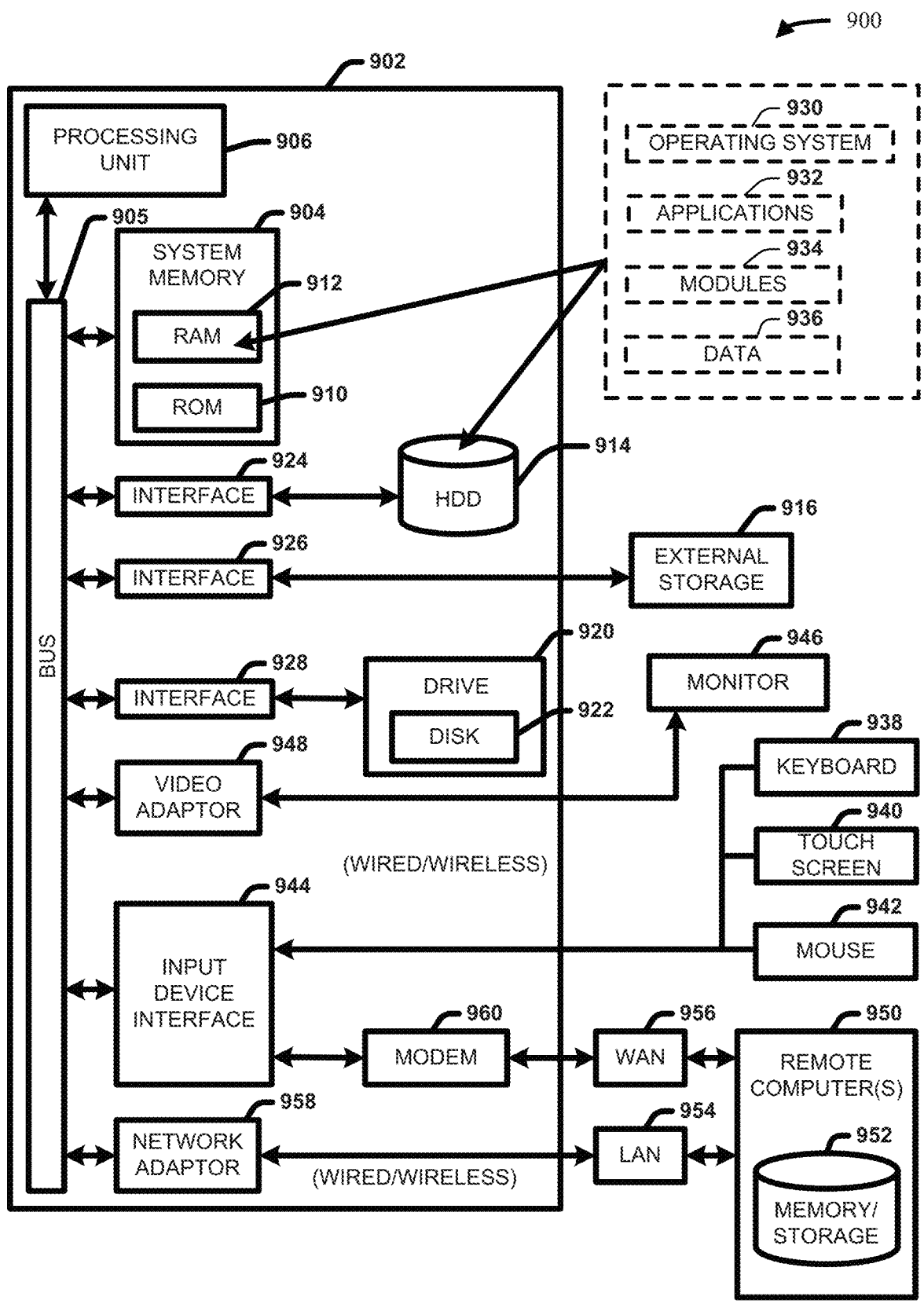
FIG. 9 illustrates a block diagram of an example, non-limiting, operating environment in which one or more embodiments described herein can be operated.
Figure 10:
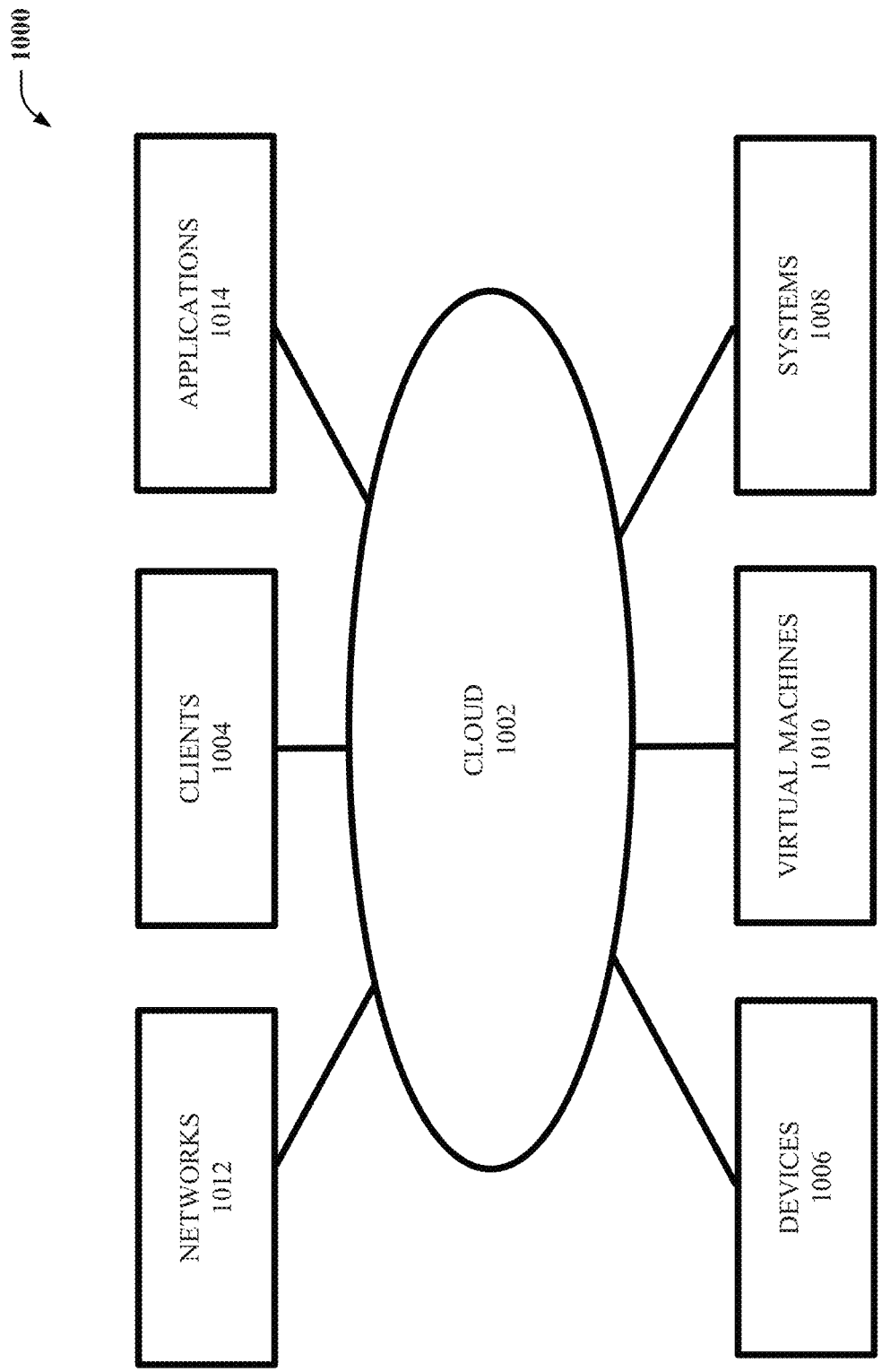
FIG. 10 illustrates a block diagram of an example, non-limiting, cloud computing environment in accordance with one or more embodiments described herein.

Turning next to FIGS. 9 and 10, a detailed description is provided of additional context for the one or more embodiments described herein at FIGS. 1-8.

FIG. 9 and the following discussion are intended to provide a brief, general description of a suitable operating environment 900 in which one or more embodiments described herein at FIGS. 1-8 can be implemented. For example, one or more components and/or other aspects of embodiments described herein can be implemented in or be associated with, such as accessible via, the operating environment 1000. Further, while one or more embodiments have been described above in the general context of computer-executable instructions that can run on one or more computers, those skilled in the art will recognize that one or more embodiments also can be implemented in combination with other program modules and/or as a combination of hardware and software.

Generally, program modules include routines, programs, components, data structures and/or the like, that perform particular tasks and/or implement particular abstract data types. Moreover, the aforedescribed methods can be practiced with other computer system configurations, including single-processor or multiprocessor computer systems, mini-computers, mainframe computers, Internet of Things (IoT) devices, distributed computing systems, as well as personal computers, hand-held computing devices, microprocessor-based or programmable consumer electronics, and/or the like, each of which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD), and/or other optical disk storage, magnetic cassettes, magnetic tape, magnetic disk storage and/or other magnetic storage devices, solid state drives or other solid state storage devices and/or other tangible and/or non-transitory media which can be used to store specified information. In this regard, the terms "tangible" or "non-transitory" herein as applied to storage, memory and/or computer-readable media, are to be understood to exclude only propagating transitory signals per se as modifiers and do not relinquish rights to all standard storage, memory, and/or computer-readable media that are not only propagating transitory signals per se.

Computer-readable storage media can be accessed by one or more local or remote computing devices, e.g., via access requests, queries, and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set and/or changed in such a manner as to encode information in one or more signals. By way of example, but not limitation, communication media can include wired media, such as a wired network, direct-wired connection and/or wireless media such as acoustic, RF, infrared, and/or other wireless media.

With reference still to FIG. 9, the example operating environment 1000 for implementing one or more embodiments of the aspects described herein can include a computer 902, the computer 902 including a processing unit 906, a system memory 904 and/or a system bus 905. One or more aspects of the processing unit 906 can be applied to processors such as 106 and/or 206 of the non-limiting systems 100 and/or 200. The processing unit 906 can be implemented in combination with and/or alternatively to processors such as 106 and/or 206.

Memory 904 can store one or more computer and/or machine readable, writable and/or executable components and/or instructions that, when executed by processing unit 906 (e.g., a classical processor, and/or like processor), can provide performance of operations defined by the executable component(s) and/or instruction(s). For example, memory 904 can store computer and/or machine readable, writable, and/or executable components and/or instructions that, when executed by processing unit 906, can provide execution of the one or more functions described herein relating to non-limiting system 100 and/or non-limiting system 200, as described herein with or without reference to the one or more figures of the one or more embodiments.

Memory 904 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM), and/or the like) that can employ one or more memory architectures.

Processing unit 906 can comprise one or more types of processors and/or electronic circuitry (e.g., a classical processor and/or like processor) that can implement one or more computer and/or machine readable, writable and/or executable components and/or instructions that can be stored at memory 904. For example, processing unit 906 can perform one or more operations that can be specified by computer and/or machine readable, writable, and/or executable components and/or instructions including, but not limited to, logic, control, input/output (I/O), arithmetic, and/or the like. In one or more embodiments, processing unit 906 can be any of one or more commercially available processors. In one or more embodiments, processing unit 906 can comprise one or more central processing unit, multi-core processor, microprocessor, dual microprocessors, microcontroller, System on a Chip (SOC), array processor, vector processor, and/or another type of processor. The examples of processing unit 906 can be employed to implement one or more embodiments described herein.

The system bus 905 can couple system components including, but not limited to, the system memory 904 to the processing unit 906. The system bus 905 can comprise one or more types of bus structure that can further interconnect to a memory bus (with or without a memory controller), a peripheral bus, and/or a local bus using one or more of a variety of commercially available bus architectures. The system memory 904 can include ROM 910 and/or RAM 912. A basic input/output system (BIOS) can be stored in a non-volatile memory such as ROM, erasable programmable read only memory (EPROM) and/or EEPROM, which BIOS contains the basic routines that help to transfer information among elements within the computer 902, such as during startup. The RAM 912 can include a high-speed RAM, such as static RAM for caching data.

The computer 902 can include an internal hard disk drive (HDD) 914 (e.g., EIDE, SATA), one or more external storage devices 916 (e.g., a magnetic floppy disk drive (FDD), a memory stick or flash drive reader, a memory card reader and/or the like) and/or a drive 920, e.g., such as a solid state drive or an optical disk drive, which can read or write from a disk 922, such as a CD-ROM disc, a DVD, a BD and/or the like. Additionally, and/or alternatively, where a solid state drive is involved, disk 922 could not be included, unless separate. While the internal HDD 914 is illustrated as located within the computer 902, the internal HDD 914 can also be configured for external use in a suitable chassis (not shown). Additionally, while not shown in operating environment 900, a solid state drive (SSD) can be used in addition to, or in place of, an HDD 914. The HDD 914, external storage device(s) 916 and drive 920 can be connected to the system bus 905 by an HDD interface 924, an external storage interface 926 and a drive interface 928, respectively. The HDD interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 912, including an operating system 930, one or more applications 932, other program modules 934 and/or program data 936. All or portions of the operating system, applications, modules, and/or data can also be cached in the RAM 912. The systems and/or methods described herein can be implemented utilizing one or more commercially available operating systems and/or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In a related embodiment, operating system 930 can comprise one virtual machine (VM) of multiple VMs hosted at computer 902. Furthermore, operating system 930 can provide runtime environments, such as the JAVA runtime environment or the .NET framework, for applications 932. Runtime environments are consistent execution environments that can allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and/or settings for an application.

Further, computer 902 can be enabled with a security module, such as a trusted processing module (TPM). For instance, with a TPM, boot components hash next in time boot components and wait for a match of results to secured values before loading a next boot component. This process can take place at any layer in the code execution stack of computer 902, e.g., applied at application execution level and/or at operating system (OS) kernel level, thereby enabling security at any level of code execution.

An entity can enter and/or transmit commands and/or information into the computer 902 through one or more wired/wireless input devices, e.g., a keyboard 938, a touch screen 940 and/or a pointing device, such as a mouse 942. Other input devices (not shown) can include a microphone, an infrared (IR) remote control, a radio frequency (RF) remote control, and/or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint and/or iris scanner, and/or the like. These and other input devices can be connected to the processing unit 906 through an input device interface 944 that can be coupled to the system bus 905, but can be connected by other interfaces, such as a parallel port, an IEEE 1394 serial port, a game port, a USB port, an IR interface, a BLUETOOTH® interface, and/or the like.

A monitor 946 or other type of display device can be alternatively and/or additionally connected to the system bus 905 via an interface, such as a video adapter 948. In addition to the monitor 946, a computer typically includes other peripheral output devices (not shown), such as speakers, printers, and/or the like.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device and/or other common network node, and typically includes many or all of the elements described relative to the computer 902, although, for purposes of brevity, only a memory/storage device 952 is illustrated. Additionally, and/or alternatively, the computer 902 can be coupled (e.g., communicatively, electrically, operatively, optically and/or the like) to one or more external systems, sources, and/or devices (e.g., computing devices, communication devices and/or like device) via a data cable (e.g., High-Definition Multimedia Interface (HDMI), recommended standard (RS) 232, Ethernet cable and/or the like).

In one or more embodiments, a network can comprise one or more wired and/or wireless networks, including, but not limited to, a cellular network, a wide area network (WAN) (e.g., the Internet), or a local area network (LAN). For example, one or more embodiments described herein can communicate with one or more external systems, sources and/or devices, for instance, computing devices (and vice versa) using virtually any specified wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and/or non-proprietary communication protocols. In a related example, one or more embodiments described herein can include hardware (e.g., a central processing unit (CPU), a transceiver, a decoder, and/or the like), software (e.g., a set of threads, a set of processes, software in execution and/or the like) and/or a combination of hardware and/or software that provides communicating information among one or more embodiments described herein and external systems, sources, and/or devices (e.g., computing devices, communication devices and/or the like).

The logical connections depicted include wired/wireless connectivity to a local area network (LAN) 954 and/or larger networks, e.g., a wide area network (WAN) 956. LAN and WAN networking environments can be commonplace in offices and companies and can provide enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can provide wired and/or wireless communication to the LAN 954, which can also include a wireless access point (AP) disposed thereon for communicating with the adapter 958 in a wireless mode.

When used in a WAN networking environment, the computer 902 can include a modem 960 and/or can be connected to a communications server on the WAN 956 via other means for establishing communications over the WAN 956, such as by way of the Internet. The modem 960, which can be internal and/or external and a wired and/or wireless device, can be connected to the system bus 905 via the input device interface 944. In a networked environment, program modules depicted relative to the computer 902 or portions thereof can be stored in the remote memory/storage device 952. The network connections shown are merely exemplary and one or more other means of establishing a communications link among the computers can be used.

When used in either a LAN or WAN networking environment, the computer 902 can access cloud storage systems or other network-based storage systems in addition to, and/or in place of, external storage devices 916 as described above, such as but not limited to, a network virtual machine providing one or more aspects of storage and/or processing of information. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, such as with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices and/or entities operatively disposed in wireless communication, e.g., a printer, scanner, desktop, and/or portable computer, portable data assistant, communications satellite, telephone, and/or any piece of equipment or location associated with a wirelessly detectable tag (e.g., a kiosk, news stand, store shelf and/or the like). This can include Wireless Fidelity (Wi-Fi) and BLUETOOTH® wireless technologies. Thus, the communication can be a predefined structure as with a conventional network or simply an ad hoc communication between at least two devices.

The illustrated embodiments described herein can be employed relative to distributed computing environments (e.g., cloud computing environments), such as described below with respect to FIG. 10, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 1002 described below with reference to illustration 1000 of FIG. 10. For instance, one or more embodiments described herein and/or components thereof can employ such one or more resources to execute one or more: mathematical function, calculation and/or equation; computing and/or processing script; algorithm; model (e.g., artificial intelligence (AI) model, machine learning (ML) model, deep learning (DL) model, and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed. That is, the one or more embodiments described herein can be implemented in a local environment only, and/or a non-cloud-integrated distributed environment, for example.

A cloud computing environment can provide one or more of low coupling, modularity and/or semantic interoperability. At the heart of cloud computing is an infrastructure that includes a network of interconnected aspects.

Moreover, the non-limiting systems 100 and/or 200, and/or the example operating environment 900 of FIG. 9, can be associated with and/or be included in cloud-based and/or partially-cloud-based system.

Referring now to details of one or more elements illustrated at FIG. 11, the illustrative cloud computing environment 1002 is depicted. Cloud computing environment 1002 can comprise one or more cloud computing nodes, virtual machines, and/or the like with which local computing devices used by cloud clients 1004, such as for example via one or more devices 1006, systems 1008, virtual machines 1010, networks 1012, and/or applications 1014.

The one or more cloud computing nodes, virtual machines and/or the like can be grouped physically or virtually, in one or more networks, such as local, distributed, private, public clouds, and/or a combination thereof. The cloud computing environment 1002 can provide infrastructure, platforms, virtual machines, and/or software for which a client 1004 does not maintain all or at least a portion of resources on a local device, such as a computing device. The various elements 1006 to 1012 are not intended to be limiting and are but some of various examples of computerized elements that can communicate with one another and/or with the one or more cloud computing nodes via the cloud computing environment 1002, such as over any suitable network connection and/or type.

CONCLUSION

The embodiments described herein can be directed to one or more of a system, a method, an apparatus, and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device, and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA), and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules. Generally, program modules include routines, programs, components, data structures, and/or the like that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
    at least one memory that stores executable components; and
    at least one processor, coupled to the at least one memory, that executes or facilitates execution of the executable components, the executable components comprising:
        a visual component that analyzes captured visual content of a real-world environment;
        an interface component that renders an interface on a mobile device that displays the captured visual content of the real-world environment overlayed with augmented reality (AR) content of an AR environment and one or more menus; and
        a design component that,
            in response to receipt, via a first interaction with the interface, of a selection of a virtual asset from the one or more menus, adds the virtual asset to the AR content overlayed on the captured visual content,
            places the virtual asset at a first location on the captured visual content indicated via a second interaction with the interface,
            in response to receipt, via a third interaction with the interface, of an indication of a second location within the real-world environment to be associated with an event, adds an event proxy graphic representing the event to the AR content overlayed on the captured visual content at the second location, and
            configures, based on interactions with the virtual asset and the event proxy graphic received via the interface, a mapping between the event and the virtual asset, wherein the mapping configures the virtual asset to perform an effect in response to detection of the event.

2. The system of claim 1, wherein the event is a person being at a defined location within the real-world environment, the person being within a defined distance from a device represented by the virtual asset, a defined gesture performed by the person, or a defined orientation of the person.

3. The system of claim 2, wherein the executable components further comprise a gesture recognition component that identifies the gesture absent a view of a full body of the person within the captured visual content.

4. The system of claim 1, wherein at least one of the first interaction or the second interaction is received via a first-person view rendered via the interface or a third-person view rendered by the interface.

5. The system of claim 1, wherein the effect performed by the virtual asset represents at least one of a visual response or an audio response to be triggered in the AR environment in response to detection of the event in the real-world environment.

6. The system of claim 1, wherein
    the executable components further comprise a detection component that detects an execution of the event in the real-world environment, and
    detection of the event by the detection component causes the virtual asset to perform the effect in the AR environment.

7. The system of claim 6, wherein,
    while in a first-person testing mode, the detection component tests performance of the effect in response to triggering of the event via detection of a three-dimensional pose of the mobile device, and while in a third-person testing mode, the detection component tests performance of the effect in response to detection of a test subject within the real-world environment performing the event.

8. The system of claim 1, wherein the interface component further displays, at a periphery of the interface, a portion of the AR content that is not in a current view of the AR environment being displayed via the interface.

9. The system of claim 1, wherein
the interface component further recognizes a horizontal plane and a vertical plane of the real-world environment, and visualizes, via the interface, an AR horizontal plane and an AR vertical plane corresponding to the horizontal plane and the vertical plane of the real-world environment, and
the interface component further recognizes the captured visual content of the real-world environment relative to the AR horizontal plane and the AR vertical plane.

10. A non-transitory machine-readable medium comprising executable instructions that, in response to execution by a processor, facilitate performance of operations, the operations comprising:
capturing visual content of a real-world environment;
rendering, via a mobile device, an interface that displays the visual content with an augmented reality (AR) environment and one or more menus overlaying the visual content;
in response to receiving, via a first interaction with the interface, a selection of a virtual asset from the one or more menus, adding the virtual asset to the AR environment overlayed on the visual content;
in response to receiving, via a second interaction with the interface, a first indication of a first location on the visual content, placing the virtual asset at the first location on the visual content;
in response to receiving, via a third interaction with the interface, a second indication of a second location on the visual content to be associated with an event, adding an event proxy graphic representing the event to the AR environment overlayed on the visual content at the second location; and
configuring, based on interactions with the virtual asset and the event proxy graphic received via the interface, a mapping between the event and an effect of the virtual asset, wherein the mapping configures the virtual asset to trigger the effect in response to detection of the event.

11. The non-transitory machine-readable medium of claim 10, wherein at least one of the first interaction, the second interaction, or the third interaction is received via a first-person view or a third-person view displayed via the interface.

12. The non-transitory machine-readable medium of claim 10, wherein
the event is a gesture performed by a person within the real-world environment, and
the operations further comprise recognizing the gesture absent a view of a full body of the person within the visual content.

13. The non-transitory machine-readable medium of claim 10, wherein
the event is at least one of an orientation of a person within the real-world environment or a gesture of the person at a location within the real-world environment or within a distance from a device represented by the virtual asset.

14. The non-transitory machine-readable medium of claim 10, wherein the operations further comprise displaying, at a periphery of the interface, AR content that is not in a view of the AR environment presently being displayed via the interface.

15. The non-transitory machine-readable medium of claim 10, wherein the operations further comprise detecting the event independent of a location of a person in the real-world environment.

16. A method, comprising:
integrating, by a system operatively coupled to a processor, visual content of a real-world environment with an augmented reality (AR) environment overlaying the real-world environment on an interface rendered via a mobile device;
in response to receiving, via a first interaction with the interface, a selection of a virtual asset from a menu of virtual assets rendered on the interface, adding the virtual asset to the AR environment overlayed on the visual content;
in response to receiving, via a second interaction with the interface, a first indication of a first location within the real-world environment, overlaying the virtual asset at the first location on the visual content;
in response to receiving, via a third interaction with the interface, a second indication of a second location within the real-world environment to be associated with an event, adding an event proxy graphic corresponding to the event at the second location on the visual content; and
in response to receiving interactions with the virtual asset and the event proxy graphic defining a mapping between the event and the virtual asset, setting the mapping between the event and the virtual asset, wherein the mapping configures the virtual asset to trigger an effect in response to detection of the event.

17. The method of claim 16, wherein the effect is at least one of a visual response or an audible response in the AR environment.

18. The method of claim 16, wherein
at least one of the first interaction or the second interaction is received via a first-person view or a third-person rendered via the interface.

19. The method of claim 18, further comprising specifying, by the system, the AR content to be placed on both of a pair of mobile devices.

20. The method of claim 16, wherein the event is at least one of a person being at a specified location within the real-world environment, the person being within a specified distance from the first location of the virtual asset, a specified gesture performed by the person, or a specified orientation of the person.

* * * * *